US011992444B1

(12) United States Patent
Sikora et al.

(10) Patent No.: US 11,992,444 B1
(45) Date of Patent: May 28, 2024

(54) APPARATUS, SYSTEM, AND METHOD TO CONTROL TORQUE OR LATERAL THRUST APPLIED TO A LOAD SUSPENDED ON A SUSPENSION CABLE

(71) Applicant: Vita Inclinata IP Holdings LLC, Broomfield, CO (US)

(72) Inventors: Derek Sikora, Denver, CO (US); Logan Goodrich, Golden, CO (US); Preston Fitzrandolph, Boulder, CO (US)

(73) Assignee: Vita Inclinata IP Holdings LLC

( * ) Notice: Subject to any disclaimer, the term of this patent is extended or adjusted under 35 U.S.C. 154(b) by 0 days.

(21) Appl. No.: 18/534,401

(22) Filed: Dec. 8, 2023

Related U.S. Application Data

(60) Provisional application No. 63/606,085, filed on Dec. 4, 2023.

(51) Int. Cl.

| | |
|---|---|
| ***G06F 7/00*** | (2006.01) |
| ***A61G 3/00*** | (2006.01) |
| *B66C 13/06* | (2006.01) |

(52) U.S. Cl.
CPC .......... *A61G 3/006* (2013.01); *A61G 2220/10* (2013.01); *B66C 13/06* (2013.01)

(58) Field of Classification Search
CPC ..... A61G 3/006; A61G 2220/10; B66C 13/06
USPC .................................................... 700/28, 213
See application file for complete search history.

(56) References Cited

U.S. PATENT DOCUMENTS

| | | | |
|---|---|---|---|
| 1,935,283 | A | 11/1933 | Adams |
| 2,264,936 | A | 12/1941 | Dorsa |
| 2,428,656 | A | 10/1947 | Elliott et al. |
| 2,651,533 | A | 9/1953 | Cecil |
| 2,717,656 | A | 9/1955 | Bannister |
| 3,036,797 | A | 5/1962 | Domenico |
| 3,044,818 | A | 7/1962 | Harry |
| 3,210,115 | A | 10/1965 | Irving et al. |
| 3,265,336 | A | 8/1966 | Peterson |
| 3,498,476 | A | 3/1970 | Mattson et al. |
| 3,554,468 | A | 1/1971 | Mcvicar |
| 3,598,440 | A | 8/1971 | Ramsden et al. |
| 3,601,342 | A | 8/1971 | Piasecki |

(Continued)

FOREIGN PATENT DOCUMENTS

| | | | |
|---|---|---|---|
| CN | 116101492 | B | 6/2023 |
| EP | 0606108 | A1 | 7/1994 |

(Continued)

OTHER PUBLICATIONS

U.S. Appl. No. 17/112,804, filed Dec. 4, 2020, Mahdi Al Husseini.

(Continued)

*Primary Examiner* — Yolanda R Cumbess
(74) *Attorney, Agent, or Firm* — Martin Spencer Garthwaite

(57) ABSTRACT

Disclosed are systems, apparatuses, and methods for and related to dynamic control of torque and or lateral thrust applied to a load suspended load on a suspension cable to thereby achieve a target orientation or position or to otherwise move through use of a hyperparameter, wherein the hyperparameter comprises a normalized moment of inertia, wherein the hyperparameter comprises a ratio of a force command to a thruster and an angular acceleration.

20 Claims, 16 Drawing Sheets

(56) References Cited

U.S. PATENT DOCUMENTS

| | | | |
|---|---|---|---|
| 3,602,544 | A | 8/1971 | Marsh |
| 3,656,796 | A | 4/1972 | Cook |
| 3,690,602 | A | 9/1972 | Marsh |
| 3,724,817 | A | 4/1973 | Simons |
| 3,829,052 | A | 8/1974 | Flannelly |
| 3,833,189 | A | 9/1974 | Fowler et al. |
| 3,838,836 | A | 10/1974 | Asseo et al. |
| 3,904,156 | A | 9/1975 | Smith |
| 3,946,971 | A | 3/1976 | Chadwick |
| 4,124,181 | A | 11/1978 | Kolwey |
| 4,138,078 | A | 2/1979 | Hester et al. |
| 4,267,987 | A | 5/1981 | McDonnell |
| 4,364,704 | A | 12/1982 | Dreesen et al. |
| 4,378,919 | A | 4/1983 | Smith |
| 4,553,719 | A | 11/1985 | Ott |
| 4,601,444 | A | 7/1986 | Lindenbaum |
| 4,695,012 | A | 9/1987 | Lindenbaum |
| 4,747,745 | A | 5/1988 | Pippen et al. |
| 4,826,109 | A | 5/1989 | Camus |
| 4,881,601 | A | 11/1989 | Smith |
| 4,883,184 | A | 11/1989 | Albus |
| 4,889,297 | A | 12/1989 | Ikeda |
| 4,984,757 | A | 1/1991 | Hartung et al. |
| 5,071,184 | A | 12/1991 | Dessaux |
| 5,071,573 | A | 12/1991 | Coffindaffer et al. |
| 5,125,707 | A | 6/1992 | Chaen et al. |
| 5,131,491 | A | 7/1992 | Varner et al. |
| 5,143,326 | A | 9/1992 | Parks |
| 5,190,250 | A | 3/1993 | DeLong et al. |
| 5,249,652 | A | 10/1993 | Leitzman et al. |
| 5,273,333 | A | 12/1993 | Hatfield et al. |
| 5,299,845 | A | 4/1994 | Gabriel |
| 5,344,203 | A | 9/1994 | Tollenaere |
| 5,352,056 | A | 10/1994 | Chandler |
| 5,358,219 | A | 10/1994 | Shenk et al. |
| 5,396,815 | A | 3/1995 | Polites et al. |
| 5,443,566 | A | 8/1995 | Rushmer et al. |
| 5,451,032 | A | 9/1995 | Rhoads |
| 5,465,925 | A | 11/1995 | Connolly et al. |
| 5,499,785 | A | 3/1996 | Roberts et al. |
| 5,518,205 | A | 5/1996 | Wurst et al. |
| 5,524,870 | A | 6/1996 | Tallent et al. |
| 5,562,394 | A | 10/1996 | Brown, Jr. |
| 5,593,113 | A | 1/1997 | Cox |
| 5,613,722 | A | 3/1997 | Fandrich et al. |
| 5,816,098 | A | 10/1998 | Kanki et al. |
| 5,816,636 | A | 10/1998 | Gibson et al. |
| 5,871,249 | A | 2/1999 | Williams |
| 5,898,746 | A | 4/1999 | Baversten et al. |
| 5,927,438 | A | 7/1999 | Ostrobrod |
| 5,961,563 | A | 10/1999 | Overton |
| 6,189,834 | B1 | 2/2001 | Dietz et al. |
| 6,199,793 | B1 | 3/2001 | Hainsworth et al. |
| 6,439,407 | B1 | 8/2002 | Jacoff et al. |
| 6,533,220 | B2 | 3/2003 | Schuster |
| D473,482 | S | 4/2003 | Felmingham |
| 6,578,796 | B2 | 6/2003 | Maeda |
| 6,708,926 | B2 | 3/2004 | Bonisch |
| 6,814,185 | B1 | 11/2004 | Ostrobrod |
| 6,983,833 | B2 | 1/2006 | Ivers et al. |
| 7,028,351 | B1 | 4/2006 | Frieder et al. |
| 7,131,515 | B2 | 11/2006 | Gartsbeyn et al. |
| 7,267,240 | B2 | 9/2007 | Maurer et al. |
| 7,720,582 | B2 | 5/2010 | Makinadjian |
| D617,293 | S | 6/2010 | Yoshihashi |
| 7,887,011 | B1 | 2/2011 | Baldwin |
| 7,948,237 | B2 | 5/2011 | Kuzmin et al. |
| 8,131,384 | B2 | 3/2012 | Karpman et al. |
| 8,157,205 | B2 | 4/2012 | McWhirk |
| 8,226,042 | B1 | 7/2012 | Howell et al. |
| 8,231,083 | B2 | 7/2012 | Kutzmann et al. |
| 8,292,229 | B2 | 10/2012 | Pancotti et al. |
| D671,293 | S | 11/2012 | Fredriksson |
| 8,413,923 | B2 | 4/2013 | Brenner et al. |
| 8,496,279 | B2 | 7/2013 | Aoki |
| 8,534,607 | B2 | 9/2013 | Tardiff et al. |
| 8,534,608 | B1 | 9/2013 | Cox, IV |
| 8,591,161 | B1 | 11/2013 | Bernhardt |
| 8,840,355 | B1 | 9/2014 | Kulesha |
| 8,886,402 | B1 | 11/2014 | Lou |
| 8,888,048 | B2 | 11/2014 | Figoureux et al. |
| 8,894,050 | B2 | 11/2014 | Wootten et al. |
| 8,899,903 | B1 | 12/2014 | Saad et al. |
| 8,903,568 | B1 | 12/2014 | Wang et al. |
| 8,925,901 | B2 | 1/2015 | Gaillard |
| 8,938,325 | B1 | 1/2015 | McGinnis et al. |
| 8,967,533 | B2 | 3/2015 | DeVaul et al. |
| 9,027,976 | B1 | 5/2015 | Tollenaere |
| 9,096,294 | B1 | 8/2015 | Dong et al. |
| 9,114,871 | B2 | 8/2015 | Woodworth et al. |
| 9,194,977 | B1 | 11/2015 | Dungan et al. |
| 9,205,922 | B1 | 12/2015 | Bouwer |
| 9,223,008 | B1 | 12/2015 | Hartman et al. |
| 9,242,741 | B1 | 1/2016 | Cockell |
| 9,302,770 | B2 | 4/2016 | Burgess et al. |
| 9,375,841 | B1 | 6/2016 | Kemper |
| 9,422,139 | B1 | 8/2016 | Bialkowski et al. |
| 9,676,481 | B1 | 6/2017 | Buchmueller |
| 9,688,404 | B1 | 6/2017 | Buchmueller et al. |
| 9,797,723 | B1 | 10/2017 | Huang |
| 9,800,091 | B2 | 10/2017 | Nugent, Jr. et al. |
| 9,836,063 | B1 | 12/2017 | Bonawitz et al. |
| 9,849,981 | B1 | 12/2017 | Burgess et al. |
| 9,850,113 | B2 | 12/2017 | Melin et al. |
| 9,881,506 | B1 | 1/2018 | Gentry |
| 9,908,756 | B2 | 3/2018 | Heravi et al. |
| 9,958,876 | B2 | 5/2018 | Lind et al. |
| 10,023,312 | B2 | 7/2018 | Repp et al. |
| 10,023,313 | B2 | 7/2018 | Behrens et al. |
| 10,071,804 | B1 | 9/2018 | Buchmueller et al. |
| 10,112,805 | B1 | 10/2018 | Joralmon |
| 10,479,503 | B2 | 1/2019 | Sikora |
| 10,286,943 | B1 | 5/2019 | Greenblatt et al. |
| 10,288,075 | B2 | 5/2019 | Ishiba |
| 10,451,504 | B2 | 10/2019 | Campbell et al. |
| 10,519,013 | B2 | 12/2019 | Curran et al. |
| 10,870,558 | B2 | 2/2020 | Sikora |
| 10,676,190 | B2 | 6/2020 | Mitchell et al. |
| 10,899,586 | B2 | 1/2021 | Cranney, III |
| 11,142,316 | B2 | 1/2021 | Sikora |
| 10,918,892 | B2 | 2/2021 | Dickson |
| 10,940,061 | B2 | 3/2021 | Sikora |
| 10,960,976 | B2 | 3/2021 | Bosma et al. |
| 11,008,198 | B2 | 5/2021 | Sikora |
| 11,209,836 | B1 | 5/2021 | Sikora |
| 11,142,433 | B2 | 10/2021 | Sikora |
| 11,339,034 | B2 | 5/2022 | Sikora |
| 11,370,642 | B2 | 6/2022 | Markwell |
| 11,535,496 | B2 | 12/2022 | Al-Husseini et al. |
| 11,618,566 | B1 | 4/2023 | Sikora |
| 11,620,597 | B1 | 4/2023 | Sikora |
| 11,746,951 | B2 | 9/2023 | Sikora |
| 2002/0113448 | A1 | 8/2002 | Kazerooni et al. |
| 2003/0085319 | A1 | 5/2003 | Wagner et al. |
| 2003/0121024 | A1 | 6/2003 | Hill et al. |
| 2003/0220177 | A1 | 11/2003 | Orlando |
| 2004/0026349 | A1 | 2/2004 | Colgate et al. |
| 2004/0032140 | A1 | 2/2004 | Solstad |
| 2005/0072965 | A1 | 4/2005 | Sanders et al. |
| 2005/0242237 | A1 | 11/2005 | Scott |
| 2006/0163892 | A1 | 7/2006 | Nguyen et al. |
| 2007/0200032 | A1 | 8/2007 | Eadie et al. |
| 2008/0027566 | A1 | 1/2008 | Baek et al. |
| 2008/0272566 | A1 | 11/2008 | Thompson |
| 2009/0004004 | A1 | 1/2009 | Vincenzi |
| 2009/0152391 | A1 | 6/2009 | McWhirk |
| 2009/0200428 | A1 | 8/2009 | Smith et al. |
| 2010/0000349 | A1 | 1/2010 | Stevens et al. |
| 2010/0012771 | A1 | 1/2010 | Jess |
| 2010/0176618 | A1 | 7/2010 | Souke et al. |
| 2010/0237183 | A1 | 9/2010 | Wilson et al. |
| 2010/0291707 | A1 | 11/2010 | Mirkin et al. |
| 2010/0319910 | A1 | 12/2010 | Ives et al. |
| 2011/0168514 | A1 | 7/2011 | Lee |

(56) References Cited

U.S. PATENT DOCUMENTS

| | | | |
|---|---|---|---|
| 2011/0192932 | A1 | 8/2011 | Brenner et al. |
| 2012/0006779 | A1 | 1/2012 | Mills et al. |
| 2012/0145832 | A1 | 6/2012 | Schuster |
| 2012/0150364 | A1 | 6/2012 | Tillotson et al. |
| 2012/0271582 | A1 | 10/2012 | Bageshwar et al. |
| 2012/0292434 | A1 | 11/2012 | Welsh |
| 2012/0293177 | A1 | 11/2012 | Dodds |
| 2013/0054054 | A1 | 2/2013 | Tollenaere et al. |
| 2013/0056586 | A1 | 3/2013 | Occhiato et al. |
| 2013/0081245 | A1 | 4/2013 | Vavrina et al. |
| 2013/0270393 | A1 | 10/2013 | Shrapnel |
| 2013/0299634 | A1 | 11/2013 | Haggard |
| 2014/0154965 | A1 | 6/2014 | Han et al. |
| 2014/0224755 | A1 | 8/2014 | Eriksson et al. |
| 2014/0252170 | A1 | 9/2014 | Prud'Homme-Lacroix |
| 2014/0333232 | A1 | 11/2014 | Verheyen |
| 2015/0041598 | A1 | 2/2015 | Nugent et al. |
| 2015/0151837 | A1 | 6/2015 | Sane et al. |
| 2015/0360779 | A1 | 12/2015 | Behrens et al. |
| 2016/0009393 | A1 | 1/2016 | Repp et al. |
| 2016/0009531 | A1 | 1/2016 | Saliba et al. |
| 2016/0031683 | A1 | 2/2016 | Fenker et al. |
| 2016/0048131 | A1 | 2/2016 | Lesperance et al. |
| 2016/0236779 | A1 | 8/2016 | Thomas et al. |
| 2016/0240417 | A1 | 8/2016 | Tomida |
| 2016/0297650 | A1 | 10/2016 | Bang et al. |
| 2016/0298962 | A1 | 10/2016 | Lee |
| 2016/0332728 | A1 | 11/2016 | Winfree et al. |
| 2016/0340030 | A1 | 11/2016 | Roussey et al. |
| 2016/0340035 | A1 | 11/2016 | Duru |
| 2016/0340039 | A1 | 11/2016 | Waltner et al. |
| 2017/0009859 | A1 | 1/2017 | Sevagen |
| 2017/0052676 | A1 | 2/2017 | Pulier et al. |
| 2017/0073055 | A1 | 3/2017 | Song |
| 2017/0088261 | A1 | 3/2017 | Sequeira et al. |
| 2017/0129749 | A1 | 5/2017 | Mijangos et al. |
| 2017/0138737 | A1 | 5/2017 | Cordova et al. |
| 2017/0197718 | A1 | 7/2017 | Buchmueller |
| 2017/0217566 | A1 | 8/2017 | Ichinose |
| 2017/0276139 | A1 | 9/2017 | Ishiba |
| 2017/0284795 | A1 | 10/2017 | Carlson et al. |
| 2017/0291707 | A1 | 10/2017 | Veronesi et al. |
| 2018/0057318 | A1 | 3/2018 | Benton et al. |
| 2018/0072404 | A1 | 3/2018 | Prager et al. |
| 2018/0099748 | A1 | 4/2018 | Lesperance et al. |
| 2018/0208309 | A1 | 7/2018 | Wang |
| 2018/0229855 | A1 | 8/2018 | Sane et al. |
| 2018/0251346 | A1 | 9/2018 | Thomson et al. |
| 2018/0252616 | A1 | 9/2018 | Bryson et al. |
| 2018/0282130 | A1 | 10/2018 | Kale et al. |
| 2018/0339891 | A1 | 11/2018 | Ijadi-Maghsoodi et al. |
| 2019/0016480 | A1 | 1/2019 | Kashiwa et al. |
| 2019/0031474 | A1 | 1/2019 | Stilborn et al. |
| 2019/0033892 | A1 | 1/2019 | Gomez et al. |
| 2019/0055111 | A1 | 2/2019 | Cranney, III |
| 2019/0193827 | A1 | 6/2019 | Zerweckh |
| 2019/0236370 | A1 | 8/2019 | Man |
| 2019/0241267 | A1 | 8/2019 | Sikora et al. |
| 2019/0337776 | A1 | 11/2019 | Fanello et al. |
| 2019/0375615 | A1* | 12/2019 | Markwell ............... B66C 13/06 |
| 2020/0087121 | A1 | 3/2020 | Ohayon et al. |
| 2020/0165010 | A1 | 5/2020 | Sun et al. |
| 2020/0180763 | A1 | 6/2020 | Schütz et al. |
| 2020/0182252 | A1 | 6/2020 | Nakasuji et al. |
| 2020/0210704 | A1 | 7/2020 | Han et al. |
| 2020/0222257 | A1 | 7/2020 | Sikora et al. |
| 2020/0231415 | A1 | 7/2020 | Sikora et al. |
| 2020/0271270 | A1 | 8/2020 | Sikora et al. |
| 2020/0369492 | A1 | 8/2020 | Sikora |
| 2020/0400330 | A1 | 12/2020 | Przybylski et al. |
| 2021/0371250 | A1 | 12/2021 | Bedgood et al. |
| 2021/0371252 | A1 | 12/2021 | Sikora et al. |
| 2022/0135378 | A1 | 1/2022 | Sikora |
| 2022/0121225 | A1 | 4/2022 | Sikora |
| 2022/0002746 | A1 | 5/2022 | Sikora |
| 2022/0002748 | A1 | 5/2022 | Sikora |
| 2022/0371736 | A1 | 7/2022 | Sikora |
| 2022/0274696 | A1 | 9/2022 | Sikora et al. |
| 2022/0274809 | A1 | 9/2022 | Sikora et al. |
| 2022/0277472 | A1 | 9/2022 | Birchfield et al. |
| 2022/0281721 | A1 | 9/2022 | Sikora et al. |
| 2022/0371729 | A1* | 11/2022 | Saikin .................... G05D 1/101 |
| 2023/0084439 | A1* | 3/2023 | Oshima ................... B66F 19/00 244/17.23 |
| 2023/0117935 | A1 | 4/2023 | Al-Husseini et al. |

FOREIGN PATENT DOCUMENTS

| | | | |
|---|---|---|---|
| GB | 2327657 | A | 2/1999 |
| GB | 2457149 | A | 8/2009 |
| GB | 2513646 | A | 11/2014 |
| JP | H04256686 | A | 9/1992 |
| JP | H0543184 | A | 2/1993 |
| JP | H05193584 | A | 8/1993 |
| JP | H07179288 | A | 7/1995 |
| JP | 08312588 | A | 11/1996 |
| JP | H09317795 | A | 12/1997 |
| JP | 10032961 | | 2/1998 |
| JP | H10305989 | A | 11/1998 |
| JP | H1111859 | A | 1/1999 |
| JP | 11037093 | A | 2/1999 |
| JP | 2016210607 | A | 12/2016 |
| JP | 2017500257 | A | 1/2017 |
| JP | 2018140860 | A | 9/2018 |
| JP | 2019023143 | A | 2/2019 |
| JP | 6554258 | B1 | 7/2019 |
| NO | 20171181 | A1 | 1/2019 |
| WO | 2011012915 | R | 2/2011 |
| WO | 2014076189 | A1 | 5/2014 |
| WO | 2018090104 | A1 | 5/2018 |
| WO | 2018234670 | A1 | 12/2018 |
| WO | WO2019156782 | A1 | 1/2019 |
| WO | 2020167867 | | 2/2020 |
| WO | WO2020176665 | | 2/2020 |
| WO | WO2021016277 | | 7/2020 |
| WO | WO2021108703 | | 11/2020 |
| WO | WO2021108714 | | 11/2020 |
| WO | 2021194628 | | 1/2021 |
| WO | WO2022250736 | | 12/2021 |
| WO | WO2023211499 | | 11/2022 |

OTHER PUBLICATIONS

U.S. Appl. No. 18/523,266, filed Nov. 29, 2023, Derek Sikora.

U.S. Appl. No. 62/627,920, filed Feb. 8, 2018, Derek Sikora.

U.S. Appl. No. 62/757,414, filed Nov. 8, 2018, Caleb B. Carr.

U.S. Appl. No. 62/804,020, filed Feb. 11, 2019, Derek Sikora.

U.S. Appl. No. 62/810,875, filed Feb. 26, 2019, Derek Sikora.

U.S. Appl. No. 62/876,721, filed Jul. 21, 2019, Caleb B. Carr.

U.S. Appl. No. 62/940,155, filed Nov. 25, 2019, Derek Sikora.

U.S. Appl. No. 62/966,851, filed Jan. 28, 2020, Derek Sikora.

All pages, Written Opinion dated Apr. 30, 2020 for PCT Application No. PCT/US2020/017790, filed Feb. 11, 2020.

Extended European Search Report and Search Opinion, Application No. EP 19 751 097.7, mailed Aug. 31, 2021, 15 pages.

Internal Search Report mailed Apr. 30, 2020 for PCT/US2020/017790, filed Feb. 11, 2020.

International Search Report dated Apr. 3, 2019, for PCT/US19/13603 filed Jan. 15, 2019.

International Search Report in PCT/US2020/062414, mailed Feb. 19, 2021, entire document.

International Search Report mailed May 27, 2020 for PCT.US20/19967 filed Feb. 26, 2020.

International Search Report mailed Oct. 6, 2020, for PCT/US2020/042936, filed Jul. 2020.

Phillip J. McKerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.

(56) References Cited

OTHER PUBLICATIONS

Written Opinion in PCT/US2020/062414, mailed Feb. 19, 2021, entire document.
Written Opinion mailed Apr. 3, 2019, for PCT/US19/13603, filed Jan. 15, 2019.
Written Opinion mailed May 27, 2020, for PCT/US20/19967, filed Feb. 26, 2020.
Written Opinion mailed Oct. 6, 2020 for PCT/US2020/042936 filed Jul. 21, 2020.
Young, L.A ,"Enhanced Rescue Lift Capability", 63rd Annual Forum of the AHS international, Virginia Beach, VA, May 1-3, 2007 (May 2007). FIG.2,5,12,16, Abstract pp. 6-12.

* cited by examiner

APPARATUS, SYSTEM, AND METHOD TO CONTROL TORQUE OR LATERAL THRUST APPLIED TO A LOAD SUSPENDED ON A SUSPENSION CABLE

FIELD

This disclosure is directed to improved apparatus, system, and method for and related to control of a thruster, wherein the thruster and a suspended load are suspended on a suspension cable beneath a carrier and wherein the thruster applies torque and or lateral thrust to the suspended load, further wherein a control system autonomously and continuously outputs a thrust control signal to the thruster, wherein the thrust control signal compensates for an orientation and location of the thruster relative to other thrusters (if any) and or relative to the suspended load.

BACKGROUND

People, materials, and or equipment ("loads") may be suspended on a suspension cable, e.g. below a moving object, such as a helicopter, crane, or the like, or below a non-mobile object (such as, e.g. a building, bridge, or the like). The suspension cable may be part of a hoist system, to raise and lower the suspension cable and load. Suspended loads are not typically buoyant, though maybe. Cranes, helicopters and non-mobile objects, all with a suspension cable (and optionally with a hoist system), are referred to herein as "carriers". When a load is secured to a suspension cable beneath a carrier, it may be referred to herein as a "suspended load" or as a "load".

During operations with suspended loads, suspended loads may be subject to wind, impacts with or by other objects, movement by the carrier, change in the suspended load, and other external and internal disturbances or dynamics that may cause the suspended load to move. At times, such movement may be desired, but at times such movement may be undesirable. For example, the movement may move the suspended load away from a desired orientation or location or the movement may be unstable, unpredictable, and or hazardous.

Operators of carriers, such as helicopter crew, crane crew, and building maintenance personnel, may use equipment that provides control of a suspended load, including equipment that provides suspended load control remote from the carrier, e.g. at or near the suspended load, including at or near a terminus of a suspension cable. Such suspended load control equipment may control suspended loads with powered fans, such as electric ducted fans ("EDF"), flywheels, reaction wheels, or the like (together, referred to herein as a "thruster"). Physical and logical components of a control system which provides suspended load control of a suspended load, wherein the suspended load is remote from a carrier on a suspension cable, is referred to herein as a suspended load control system ("SLCS").

Observed motion of suspended loads may include the following components: vertical translation (motion up and down) along the Z axis (referred to herein as "vertical translation"); horizontal translation along either or both the X and Y axis; and rotation or "yaw" about the Z axis. Roll (rotation about the X axis) and pitch (rotation about the Y axis) may also occur, though if a load is suspended by a cable and is not buoyant, the typical motions are vertical translation, horizontal translation, and yaw. An example of axis, when discussed herein, are illustrated in FIG. 1, axis 120. Vertical and horizontal translation and yaw of a suspended load may be caused by movement of the suspension cable, movement of the carrier, winding of a hoist winch up or down relative to a carrier, movement of the load, differences in speed and momentum between the suspended load and the carrier, by wind-including propeller wash, environmental wind, and the like-impacts, and external forces. Horizontal translation can manifest as lateral motion or as conical pendulum motion of the load, with the pivot point of the pendulum where the suspension cable is secured to the carrier ("pendular motion"). Because the carrier may have a relatively fixed elevation and because the suspension cable may have low stretch, pendular motion may include a component of vertical translation. Pendular motion may also be referred to as elliptical motion. Lateral motion may be understood as a special case of pendular motion, when the load swings only in a line along one stable arc.

When torque is imparted on a suspended load, wherein the torque is not imparted symmetrically around a center of mass or center of rotation of the suspended load (which may be consistent with a location of the suspension cable, relative to the suspended load), one or more of yaw of the suspended load and or pendular motion of the suspended load may result.

Yaw, lateral motion, and pendular motion complicate lift operations, cause delays, may cause injury or death of aircrew, crane operators, and of people on the ground, and may cause damage to the suspended load and or other objects. Yaw can produce dizziness and disorientation in humans and transported non-human animals. Yaw and lateral and pendular motion can also interfere with bringing a suspended load into a carrier and or with delivering a suspended load to a location. For example, delivery of a load to a deck of a ship may be complicated by pendular motion or yaw of the load, even if the deck is stable and is not also subject to heave, roll, or pitch, as it may be. For example, bringing a person in a litter into a helicopter or onto a helicopter strut may be hazardous if the litter undergoes yaw or pendular motion as it is drawn up to the helicopter. For example, moving construction materials around a construction site with a crane may be hazardous, may be slowed, or may result in damages and loss if the construction materials undergo yaw or pendular motion. One or more components of undesired motion of the load may increase in amplitude and or frequency and otherwise grow more pronounced as a load is drawn up to the carrier and the suspension cable shortens. Horizontal and pendular motion of a load can also interact with the carrier to produce dangerous reactive or sympathetic motion in the carrier. Yaw of a load can cause winding up or winding down of a suspension cable, unless the suspension cable is separated from the load by a low friction rotational coupling (low friction, relative to the capacity of the suspension cable to store torque as potential energy before it develops a kink).

In addition, some suspended load operations may involve an obstacle, such as a surface, cliff wall, building, bridge, tree limb, overhang, or other obstacle that may interfere with one or more of carrier, load, and or suspension cable.

In addition, attempts to induce yaw in, to stop yaw of, or to drive a suspended load to a position may result in the suspended load rotating or moving "too far" or "too fast". E.g., when rotating a suspended load to a target orientation, the suspended load may have angular momentum which either causes the suspended load to rotate "too far", past a target orientation, or "too fast", beyond an ability of a thruster to change the rotational momentum within a desired period of time.

In addition, a thruster used to impart torque or thrust on the suspended load may have limited power. Limitations on power available to the thruster may come from finite battery power or fuel, by finite remote power or fuel that may be transmitted, e.g. through a conduit, to the thruster, by heat production, heat exhaust, and the like.

Consumption of power and or passage of time may be required to rotate or drive the suspended load to a desired orientation or position; this consumption of power and passage of time may be increased if the suspended load is rotated “too far” or “too fast” by the SLCS. Many control systems are prone to driving suspended loads “too far” or “too fast” or to otherwise produce undesirable behavior. For example, proportional integral derivative (“PID”) control systems are known to control a system to achieve a target objective, such as a target speed, though are also known to produce oscillation of the system relative to the target objective, either as the system moves toward the target or even as the system attempts to maintain a steady state relative to the target. Such behavior may be referred to herein as, “self-induced cyclic motion” and or as “seeking behavior”.

In many contexts, such seeking behavior is acceptable. However, in the context of an SLCS, for which the target objective may be a particular orientation or a particular position, such seeking behavior may be particularly undesirable. For example, if the SLCS and load are not tightly connected and the SLCS engages in seeking behavior, momentum transfer between the SLCS and load may cause the seeking behavior to be persistent, to become unstable, and or a reasonably stable orientation or position may not be attainable. For example, even seeking behavior which can arrive at a reasonably stable orientation or position may require additional time to do so, as an operator of the SLCS and others wait for the seeking behavior to stabilize. For example, the SLCS may be battery operated and may have a limited deployment time; seeking behavior may expend the limited power, including to continuously address self-induced cyclic motion even after the orientation or position is largely achieved.

In addition, operating circumstances of an SLCS may change significantly during use. By way of example, an SLCS may be rotated to an orientation or driven to a position without a load or with a partial load and then, when in the orientation or position, be attached to the load, the load may increase, the load may decrease, or the load’s inertial distribution may change. By way of example, the physical shape of a load may change, such as to extend further from or contract toward the center of mass, either of which may change the rotational inertia of the load. By way of example, disturbance forces on the SLCS, such as from wind or other external forces, may change, such as by increasing or decreasing or by changing an angle of a vector of the disturbance force. In a changing environment, static control of thrusters of the SLCS may result in undesirable behavior, such as providing too much power when the load or disturbances is relatively light and not providing enough power when the load or disturbances is relatively heavy. Changes in operating circumstances of an SLCS may be difficult for operators of an SLCS to adapt to and may require the operator to undergo training in relation thereto.

Furthermore, an SLCS, a carrier, and other components involved in control of a suspended load may achieve a target orientation or position in a shorter time period, may achieve a target orientation or position more efficiently, may achieve or maintain a target orientation or position with reduced power, may achieve a target orientation or position in a manner which is easier for a human operator to control, may achieve a target orientation or position with less hazardous behavior, may dynamically modify behavior in response to changes in the load and the environment, and or use of an SLCS may be made more likely if the SLCS can respond to changes in the load and in the environment and or if the SLCS can control torque and or lateral thrust applied to a suspended load to achieve a target orientation or position or to move with reduced self-induced cyclic motion or seeking behavior.

In terms of operating circumstances of an SLCS, a prior art logical control system of an SLCS may include “hard coded” values; e.g. values not dynamically determined or dynamically provided to the logical control system, but coded in a relatively static way into the logic of the control system. Such hard coded values may include, for example, a distance between thrusters, a moment arm of a thruster, such as a single thruster, relative to a suspended load, identification of which thrusters produce thrust vectors in which directions, and or an orientation of thrusters. However, if an SLCS is deployed with a different configuration of thrusters, with a different distance between thrusters, with a different orientation, or with a different configuration of thrusters relative to a center of gravity or center of rotation of the load, or if a configuration of thrusters relative to one another or relative to the load changes during a deployment, then the control system with hard coded values may not function properly or may provide reduced function if the hard coded value is or are not updated. Failure or reduced function may result in inability to control the suspended load, one or both of underdriving or overdriving the load relative to an objective, undesirable power consumption, or the like.

A configuration of thrusters relative to one another or relative to the load may change during a deployment and between different deployments. Change during a deployment may include, for example, a change in the load, release of a portion of a load, a change in the inertial moment of the load, change in location of a thruster, reconfiguration of more than one of a plurality of thrusters, change in rigging, change in function of a thruster, damage to or loss of a thruster, change in elevation, change in thrust fluid, or the like. Changes between different deployments may involve similar factors, with greater certainty of change in the load and change in rigging.

To address such changes between different deployments, personnel may update configuration information of an SLCS, such as “hard coded” or firmware embedded values for variables representing thruster-to-thruster spacing, representing relative or absolute orientation of thrusters, representing a thruster moment arm, and the like. Some of such changes may occur in a context, such as an emergency, during which optimal control of an SLCS may be highly desired. However, it may not be possible to update the configuration information. Even during routine changes between different deployments, updating the configuration information may be expensive, inconvenient, not possible, prone to error, or may add to the overall cost and complexity of operating the load control system.

Even for a prior art logical control system which may use sensor input to estimate parameters of the SLCS, such as a rotational inertia of the SLCS, or cameras, global position system (“GPS”), or compass(es) to estimate spacing and orientation of thrusters, the complexity of the system, sensors, communication systems, computer processors, operating environment, and the like may result in a system that is more costly to make and maintain and which is "brittle", in the sense that it may fail due to a wide range of problems.

Needed is a load control system which autonomously optimizes thrust output and control according to continuously updated state or configuration information, wherein the state or configuration information accounts for thruster-to-thruster distance, thruster-to-load moment arm configuration, and thruster-to-external forces using as few physical and logical components as possible, without requiring direct human or other sensor input of parameters such as thruster-to-thruster distance, and preferably in a manner that is reliable, quick, continuous, requires low power and few computational resources, and which uses minimal sensor input from highly reliable sensors.

DETAILED DESCRIPTION

Figure 1:
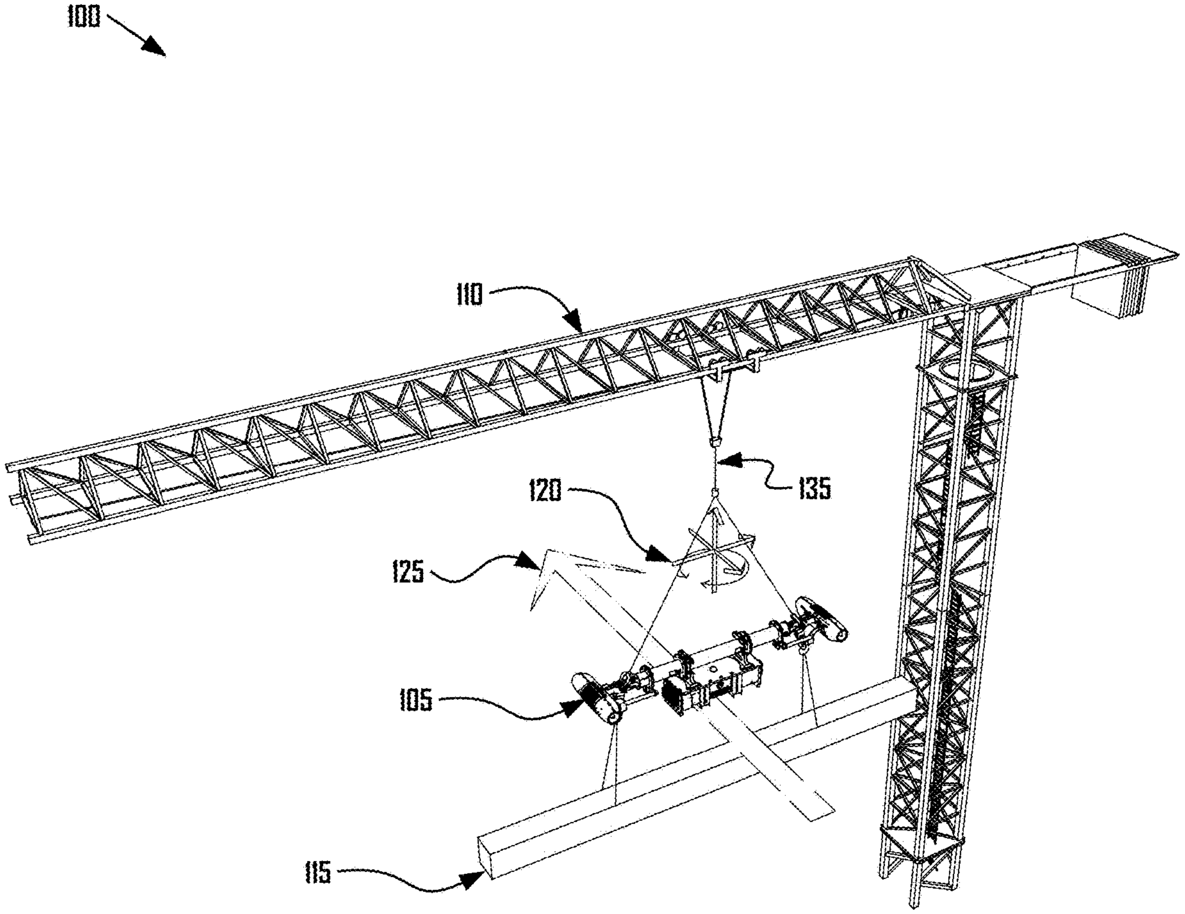
FIG. 1 illustrates a suspended load control system ("SLCS"), a load, and a carrier, in which the SLCS and load are in a starting position relative to a target orientation, in accordance with one embodiment.

In various embodiments, as described further herein, a suspended load control system or suspended load stability system ("SLCS"), e.g. SLCS 105, independent from a carrier, e.g. carrier 110, uses a control system of the SLCS, e.g. operational module 600 and decision and control module 700 (and subroutines called therefrom), as well as logical components 501, operational components 900, and thrusters, e.g. thrusters 1205A-1205D (singular or plural, "thruster"), to apply torque or lateral thrust to a suspended load, e.g. suspended load 115.

A system model performed by decision and control module 700 may estimate state information of the SLCS and any suspended load secured to the SLCS (herein, references to an SCLS should be understood to also include any load secured the SLCS unless the context makes clear otherwise). State information of the SLCS comprises, represents, or accounts for a state of the SLCS. The state of the SLCS represented in or by the state information comprises, for example, a number of thrusters, e.g. thruster 105, an orientation of the thruster, an absolute or relative direction of thrust of the thruster, a thrust output of the thruster, a distance between the thruster and a second thruster, a mass of the load, a distance between the thruster a center of rotation of the load, and a hyperparameter. The hyperparameter may be of or may represent a normalized moment of inertia of the SLCS; the hyperparameter may comprise a ratio of a force command to the thruster and an angular acceleration of SLCS.

When the SLCS controls pendular motion, the state and configuration information may further comprise a cable length (between carrier and the SLCS), movement, position, and rotation SLCS 105 and suspended load 115, and movement, position, and rotation of carrier 110.

The system model of decision and control module 700 may further estimate or account for disturbances, such wind force, impacts on the SLCS, and relative SLCS and carrier motion.

However, the hyperparameter may account for certain elements of the state of the SLCS without having to formally model or estimate elements in the system model which may have previously have been formally modeled. For example, because the hyperparameter includes a force command to the thruster in a ratio with angular acceleration, and by operating continuously and at high rate, e.g. every 10 milliseconds, the hyperparameter "captures", includes, or represents changes in output force vectors from the thrusters, e.g. due to changes in elevation or changes in the density of thrust fluid, and changes in the effect of disturbance forces on the SLCS. For example, as the SLCS rotates, assuming a load secured thereto is not spherical, wind disturbances forces on the SLCS (and any secured load) will change with the changing relative frontal area of the SLCS. For example, as an SLCS changes elevation, performance of the thruster may change with changes in density of thrust fluid. For example, a thruster of an SLCS may fail completely or may experience a reduction in output. For example, a location or orientation of the thrusters may change or the suspended load may change, as discussed above. Because the hyperparameter is determined at a high rate, e.g. every 10 milliseconds, and because it comprises a ratio of a thrust command to the thrusters of the SLCS and an angular acceleration of the SLCS, changes in the relationship between output of the thrusters and resulting angular acceleration of the SLCS are automatically or autonomously captured or represented by the hyperparameter.

The hyperparameter was discovered after years of work with and refinement of suspended load control systems by staff of the Applicant. When it was discovered, there was disagreement and debate about whether the hyperparameter would work. For example, the hyperparameter might result in unexpected feedback or interaction with other systems, such as a gain control system. The hyperparameter might result in reduced thrust output and or might have increased power use. However, testing revealed that the hyperparameter works. The hyperparameter may be understood as a "normalized moment of inertia".

The force command to the thruster may be determined from, for example, a voltage and amperage of electrical power, and or an equivalent pulse width modulated signal, sent to a thruster of the SLCS, e.g. by an amplifier or electronic speed controller ("ESC"), and a motor rating of the thruster. The angular acceleration may be obtained from a sensor such as, for example, a gyroscope, including a microelectromechanical ("MEMS") gyroscope, an accelerometer, such as in an inertial measurement unit ("IMU"), or the like. These are reliable, high speed, and low-cost sensors. The sensor may provide an angular rate, from which the angular acceleration may be determined, such as via numerical derivative of a filtered angular rate. If using an accelerometer, it may necessary to know the distance of the accelerometer to a center of rotation, so, depending on the sensor characteristics, it may be preferable to use a gyroscope.

The hyperparameter may be implemented in the logical and physical components of the SLCS, such as in a control loop. The control loop may determine an error based on a difference between an actual orientation or position and a desired orientation or position and may iteratively seek to reduce this error, e.g. through use of a proportional, integral, or derivative ("PID") controller. For example, the hyperparameter may be used, for example, to limit or saturate at least one of a proportionate response to the error, an integral response to the error, and a derivative response to the error.

The hyperparameter may therefore represent, encode, or account a state of the SLCS, such as thruster-to-thruster distance, thruster-to-center-of SLCS rotation, fan orientation, thruster output performance, and disturbance forces, without use of information that is "hard-wired" into the SLCS. In contrast, the hyperparameter is autonomously and continuously determined by the SLCS and allows the SLCS to change its behavior to address different operations and to address changing circumstances of a single operation.

Figure 2:
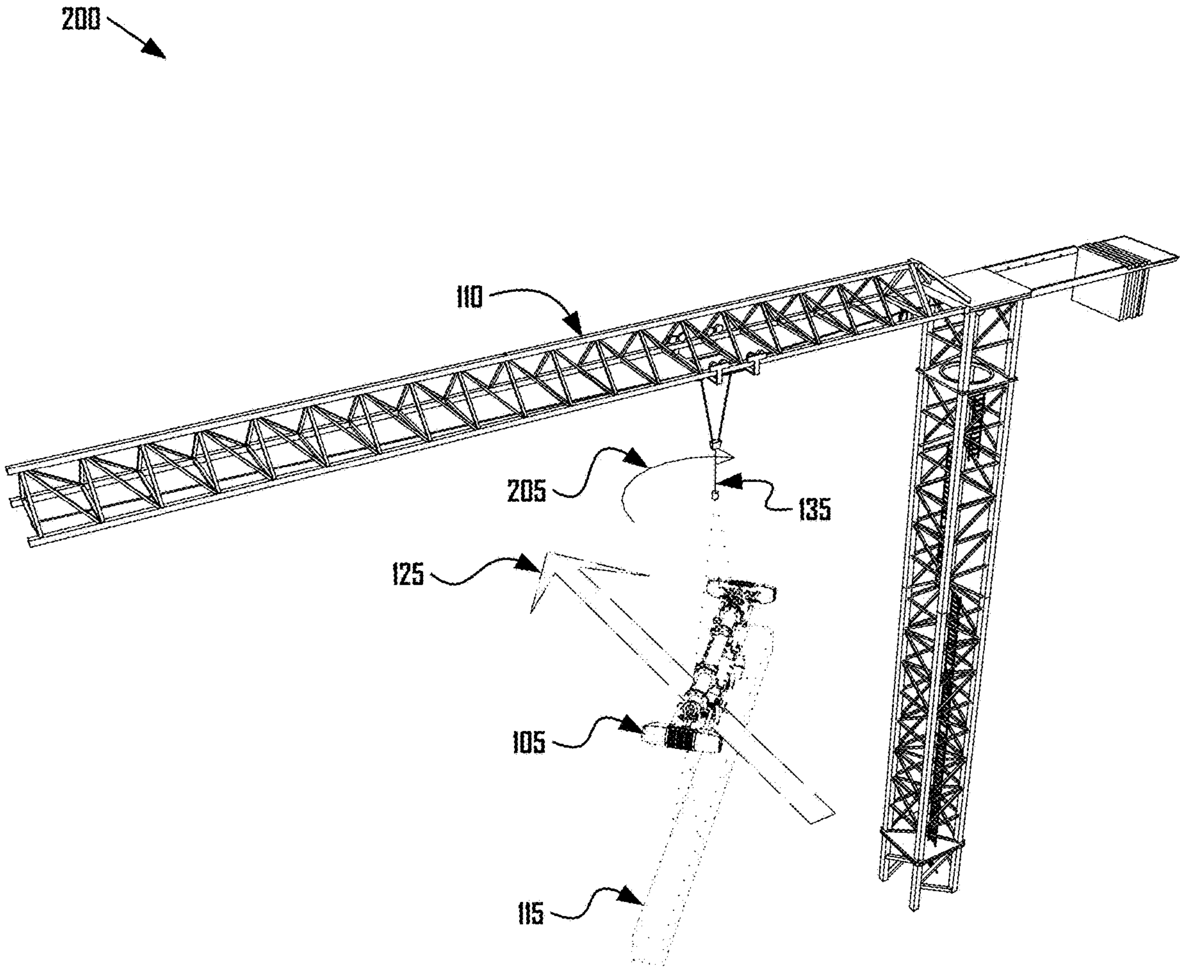
FIG. 2 illustrates SLCS, load, and carrier of FIG. 1, wherein the SLCS and load have undergone a first over-rotation, relative to the target orientation, in accordance with one embodiment.
Figure 3:
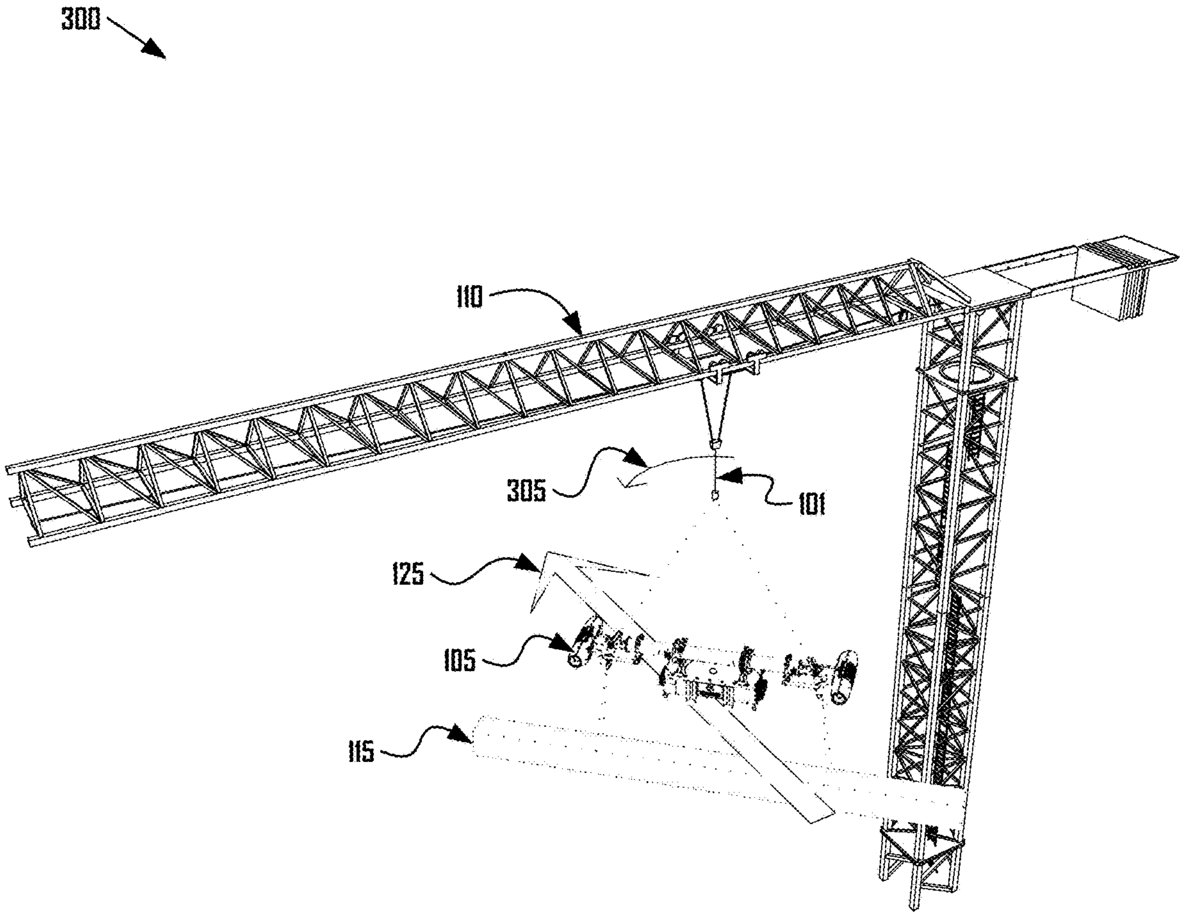
FIG. 3 illustrates SLCS, load, and carrier of FIG. 1, wherein the SLCS and load have undergone a second over-rotation, relative to the target orientation, in accordance with one embodiment.
Figure 4:
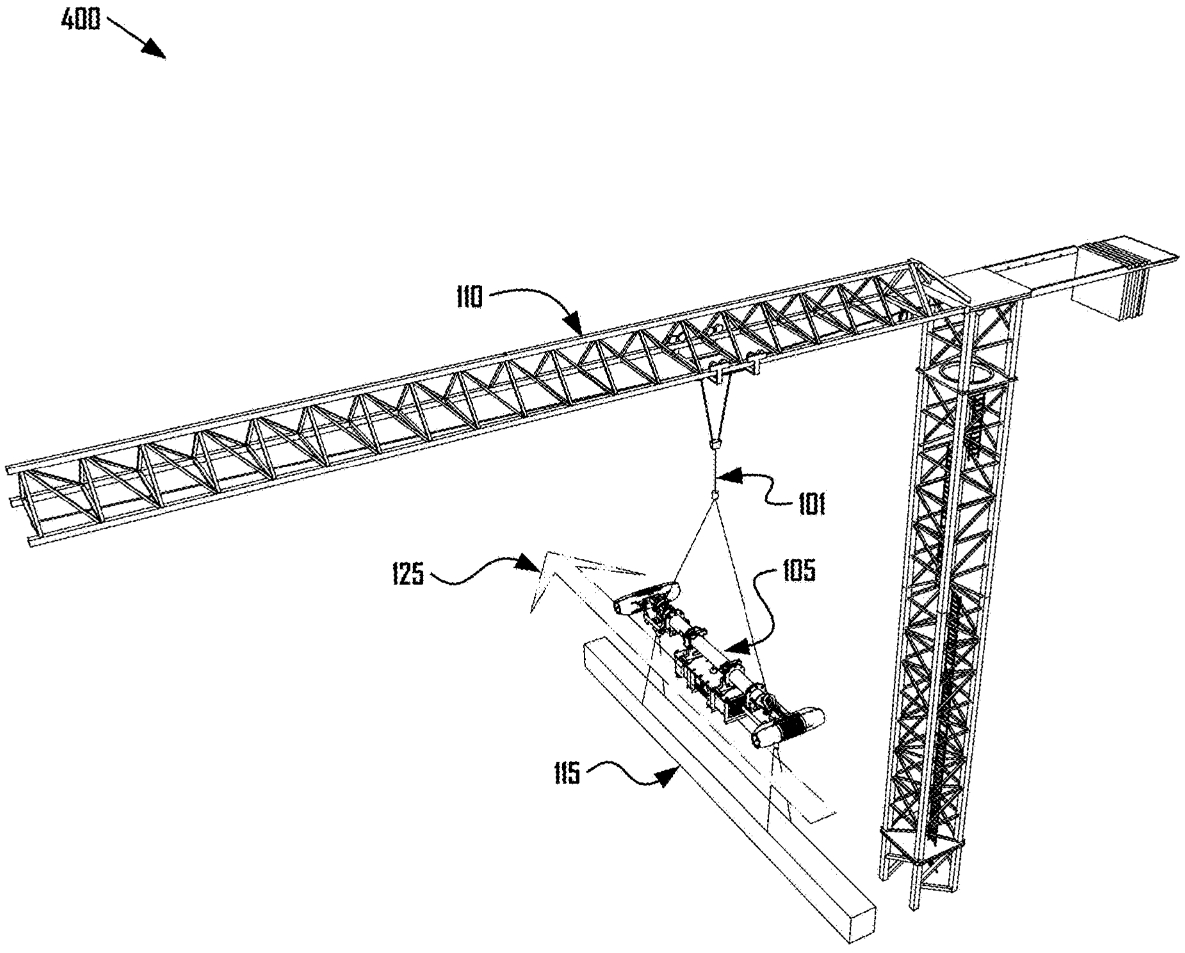
FIG. 4 illustrates SLCS, load, and carrier of FIG. 1, wherein the SLCS and load are at the target orientation, in accordance with one embodiment.

By way of example, FIG. 1 illustrates SLCS 105 and load 115 suspended below carrier 110 in scene 100; FIG. 2 illustrates SLCS 105 and load 115 suspended below carrier 110 in scene 200; FIG. 3 illustrates SLCS 105 and load 115 suspended below carrier 110 in scene 300; FIG. 4 illustrates SLCS 105 and load 115 suspended below carrier 110 in scene 400. Scene 100 through scene 400 illustrate how an operation may proceed without execution of gain adjustment module 1000 and or of autonomous state response module 1300.

In scene 100 through scene 400, thrusters of SLCS 105 comprise EDFs, though other sources of thrust, discussed herein, may be used to apply torque to rotate load 115 or may be used to apply lateral thrust to achieve a position. In scene 100, using an interface, such as remote pendant 1100, logical components 501 and operational components 900 of SLCS 105 may be instructed by an operator of SLCS 105 to moved SLCS 105 and load 115 toward target orientation 125. The instruction may be an instruction from a user of remote pendant 1100 to move in a direction toward target orientation 125 (target orientation 125 may not be specified by the user) or the instruction may comprise target orientation 125 in a functional mode or command state, e.g. functional mode or command state discussed in block 620, to move SLCS 105 and load 115 to target orientation 125. In another example (not illustrated), a position (or equivalently, a location) may be specified toward which SLCS 105 and load 115 are to move. In another example (not illustrated), an instruction may be made to implement a functional mode or command state in which undesired motion of SLCS 105 and load 115 is to be cancelled, such as rotation or pendular motion.

In scene 200 in FIG. 2, SLCS 105 has responded by applying torque to SLCS 105 and load 115 to rotate SLCS 105 and load 115 to target orientation 125; however, without operation of gain adjustment module 1000 and or of autonomous state response module 1300, SLCS 105 has over-rotated SLCS 105 and load 115, as indicated arrow 205 relative to target orientation 125. This may be due to a change in the mass or dimensions of load (e.g. if load 115 had been picked up), may be due to disturbance forces on SLCS 105 and load 115, including dynamic or changing disturbance forces such as wind, impacts, and the like. This may be due to self-induced cyclic movement or seeking behavior. Seeking behavior may be made worse by distance between SLCS 105 and load 115 and transfer of momentum between SLCS 105 and load 115.

In scene 300 in FIG. 3, SLCS 105 or an operator thereof has responded to the over-rotation of scene 200 by applying torque to SLCS 105 and load 115 to rotate SCLS 105 and load to target orientation 125; however, without operation of gain adjustment module 1000 and or autonomous state response module 1300, SLCS 105 has again over-rotated SLCS 105 and load 115, as indicated arrow 305 relative to target orientation 125. This may be due to a change in the mass or dimensions of load (e.g. if load 115 had been picked up), may be due to disturbance forces on SLCS 105 and load 115, including dynamic or changing disturbance forces such as wind or impacts. This may be due to self-induced cyclic movement or seeking behavior. Seeking behavior may be made worse by distance between SLCS 105 and load 115 and cyclic transfer of momentum between SLCS 105 and load 115.

In scene 400 in FIG. 4, SLCS 105 or an operator thereof has responded to the over-rotation of scene 300 by applying torque to SLCS 105 and load 115 to rotate SCLS 105 and load to target orientation 125. In this instance, SLCS 105 has attained target orientation 125 with SLCS 105 and load 115. However, attaining target orientation 125 may have required expenditure of additional time and or power, to go through scene 200 and scene 300. In addition, maintaining target orientation 125 in scene 400 against, for example, disturbance forces on SLCS 105 and load 115 and or against self-induced cyclic movement or seeking behavior, may result in expenditure of additional power, output through thrusters, or may delay conclusion of the operation, because load 115 may not be stably aligned with target orientation 125.

The over-rotation and or seeking behavior illustrated in scene 100 through scene 400 may be undesirable, may have made the operation more hazardous, may have required greater training on the part of the operator to address, may have delayed performance of the operation, and or may be reduced efficiency of use of SLCS 105 (whether efficiency measured in terms of time or power use—power available to thrusters may be limited, as discussed herein).

Furthermore, in prior art, the distance between thrusters and or thruster groups of SLCS 105, e.g. a first thruster group comprising thruster 1205A and 1205B, and other thrusters and or thruster groups, e.g. a second thruster group comprising thruster 1205C and 1205D, may have needed to be input into SLCS 105. Furthermore, a thrust output of the thruster may have needed to be input into SCLS 105. Furthermore, a disturbance force on the SLCS 105 (and load) may need to have been formally modeled.

In contrast, performance of the operation to move SLCS 105 and load 115 to target orientation 125 or position may be made better, may dynamically adjust to changing circumstances, may be made less hazardous, may be performed with less training on the part of the operator to address, may be performed more consistently, may be performed more quickly, may be performed without change to "hard coded" configuration information, and or may be performed with lower power use if gain adjustment module 1000 and or autonomous state response module 1300 are executed.

Gain adjustment module 1000 may change one or more parameter (as noted elsewhere, references herein to a singular noun, such as "parameter", may refer to plural such nouns, such as "parameters") of decision and control module 700 to control a gain of a thrust control signal sent to thrusters. For example, decision and control module 700 may comprise a control loop, wherein the control loop is to determine the thrust control signal based at least in part on the last-measured orientation of the load, the target orientation of the load, and the parameter. The control loop may be organized in a cascade control architecture. In an embodiment, the parameter may act upon a difference between the last-measured orientation of the load and the target orientation. This difference may also be referred to as an "error". In an embodiment, the parameter may modify at least one of a proportional-based response to the error, an integral-based response to the error, or a derivative-based response to the error. Decision and control module 700 and or gain adjustment module 1000 (as stated, reference to a top-level component may refer to sub-components within the top-level component) may comprise an open loop, a closed, loop, or a feedforward loop.

Gain adjustment module 1000 may schedule modification of the parameter based on an operating point value. The operating point value may comprise a hyperparameter. The hyperparameter may comprise or be described as a normalized moment of inertia. The hyperparameter may comprise a ratio of a thrust signal to a thruster and a rotational acceleration of the SLCS (which, as noted above, may be secured to a load) as well as a disturbance force on the SLCS. Because the hyperparameter comprises a ratio of force command to the thrusters and rotational acceleration of the SLCS and because it is determined at high speed, e.g. every 10 milliseconds, the hyperparameter captures power output by thrusters, thruster-to-thruster spacing, thruster-to-center-of-rotation, orientation of thrusters, the response of the SLCS thereto, including due to mass, mass distribution, and disturbance forces.

The operating point value, e.g. the hyperparameter and other parameters, may be obtained from the system model, wherein the system model models state parameters of the apparatus, load, carrier and environmental disturbances. Modification of the parameter based on the operating point value, e.g. based on the hyperparameter, may be referred to as "gain scheduling".

Modification of the parameter based on the operating point value may allow gain adjustment module 1000 and or autonomous state response module 1300 to adapt to differing circumstances, such as when an SLCS 105 is accelerating, decelerating, or holding constant, as may be reflected by activity of the control loop during such circumstances. For example, if the control loop comprises a loop, such as a proportional, derivative, and integral closed loop ("PID controller"), then the parameter(s) may act on portions of the control loop, such as to modify at least one of a proportional-based response to the error, an integral-based response to the error, or a derivative-based response to the error. For example, if the control loop comprises a feedforward control loop, for example, a feedforward control loop using the system model and an estimated state therefrom, which may include an estimated future state, such as an angular rate, movement, position, and rotation of SLCS 105 and suspended load 115, a movement, position, and rotation of carrier 110, and thrust output from thruster 1205, then the parameter(s), as may be scheduled based on the operating point value, e.g. on the hyperparameter, to modify the thrust control signal to the thrusters.

By modifying operation of decision and control module 700 with gain adjustment module 1000 and or autonomous state response module 1300, SLCS 105, including logical components 501 and operational components 900 of SLCS 105, responds to changing circumstances of operation of SLCS 105, such as changes in the load, changes in disturbance forces, and changes in the thrusters to provide behavior suited to the then-current circumstances, and to allow a target orientation or position to be achieved at a faster rate, with reduced self-induced cyclic motion or reduced seeking behavior, or to allow torque or thrust to be applied with more consistent behavior (from the perspective of an operator).

With this complex state and disturbance model, with gain adjustment module 1000, with autonomous state response module 1300, and with the hyperparameter which may be described as a normalized moment of inertia, the SLCS is able to control a load by dynamical modification of force output to thrusters to counteract yaw, pendular motion, to translate a load horizontally, such as to avoid an obstacle or to move a load into an offset position relative to a normal lowest-energy hanging position or "fall line" below an attachment point of a suspension cable on a carrier, such as below an arm that holds the suspension cable, and to do so with reduced self-induced cyclic motion, with better behavior (e.g. with behavior dynamically adapted to circumstances), and or to respond to changes in the load, thrusters, or disturbance forces.

An SLCS may be used to control the fine location and orientation or rotation of a load, independently from the carrier. Telemetry output from an SLCS may be used to provide feedback to a carrier crew or to processes executed by systems in a carrier. For example, the cable length estimated by an SLCS, or a location of an SLCS and load relative to a target or relative to the carrier may be output to a crew which controls a hoist or to a process which controls a hoist or to the hoist directly.

Without use of an SLCS, control of suspended loads include countermeasures installed on a carrier. For example, some airframes, such as a Skycrane helicopter, may have a rail system installed beneath a cabin to mitigate sway of a load, though, being remote from the suspended load, such rail system has marginal effect. Some approaches to this problem involve automated countering algorithms in an aircraft's stability augmentation system, though integration with an aircraft's control system is problematic and, again, the effect of such measures is limited. For example, crew chiefs who remain in a helicopter or other carrier during an extraction or operation try to affect a suspended load by pushing or pulling a suspension cable from the helicopter or carrier; such efforts have limited effect and can be hazardous. Crane and helicopter crew, both in the air and on the ground, may move loads at slow rates to minimize undesired motion or may use additional suspension cables or dedicated control cables or "tag lines" between the suspended load and the ground, neighboring structures, or the carrier; these measures increase time required to perform an operation with a suspended load, increase risks to ground and above-ground crew, increase costs, complexity, and risk of failure. All such measures are inadequate and highly problematic.

Consequently, an SLCS enhances mission safety and improves performance of carrier and suspended load operations as the SLCS dynamically determines and controls fine location and rotation of a load, separate from motion of the carrier, and as the SLCS provides telemetry information which may be used during a suspended load operation. An SLCS with gain adjustment and with use of the hyperparameter may further make operation of the SLCS more predictable for human operators, may reduce seeking behavior, may reduce time and power expended during an operation, and or may adapt to changing circumstances of the SLCS and or load.

Once deployed and in-use, the SLCS is agnostic with respect to the platform from which the load is suspended (e.g., the characteristics of a helicopter "ownship", or a crane, etc.), because it independently, autonomously, and dynamically determines thrust necessary to stabilize the load or to direct the load in a desired direction, without producing thrust which might merely destabilize the load. This permits widespread adoption of the system regardless of carrier type, lowering cost and mitigating solution risks.

An SLCS can provide benefits to, for example, helicopter search and rescue, MEDEVAC, sling load operations, forest fire helicopters, crane operations, construction sling load operations, and civilian firefighting.

Control of an SLCS may require determining the position, orientation, and or motion of an SLCS, of the carrier, and or of a load; such information may be referred to herein as "state data", "state information", or "state parameters". A subset of state information may be reported to another system; when so reported, such subset of state information may be referred to as "telemetry data" or "telemetry information". Control of a carrier and or components in a carrier, such as a winch or hoist which may be used in relation to an SLCS, may also be improved with state or telemetry information related to an SLCS, a load, and or of a carrier. An SLCS may be used in contexts in which Global Position System (GPS), magnetic compasses, or other geolocation or radionavigation systems or other position and orientation systems are unavailable, are compromised, or are subject to latency. Redundancy in state and telemetry information may also be desirable to increase reliability in implementation of control systems and to decrease latency in providing telemetry information to such systems.

Control of an SLCS and a suspended load is different from control of other automated systems, such as cars and unmanned aerial vehicles, at least because an SLCS must dynamically and recursively estimate or account for state information such as mass of SLCS and load, cable length, rotational inertia of SLCS and load, movement, position, and rotation SLCS, and movement, position, and rotation of the carrier, as well as estimating or accounting for disturbance forces, such as wind force, impacts, and relative SLCS and carrier motion.

Disclosed herein are one or more apparatuses, systems, and or methods to determine or account for state information, including cable length, mass, position, orientation, and or motion information of an SLCS, a carrier, and or of a load and to provide state information as telemetry data to one or more control apparatuses, systems, and or methods which may be remote from the SLCS. These apparatus, systems, and or methods are capable of determining or accounting for state information at or by an SLCS, including in contexts in which radionavigation systems or other absolute and relative position and orientation systems are unavailable, are compromised, or are subject to latency or error.

As described further herein, the apparatus, systems, and or methods may integrate machine-vision information with other sensor information, such as from an inertial navigation system and from LIDAR (possibly a portmanteau of "light and radar" or an acronym for "light detection and ranging"), to localize an SLCS relative to a carrier or another object. Machine-vision information may be produced through image capture by cameras in an SLCS and object detection of the carrier and or load in such images; when integrated with information from inertial navigation system and LIDAR systems, localized relative state information (including relative orientation and position of the carrier, load and or SLCS, and separate heading vectors of carrier and SLCS within a localized coordinate system) may be developed with low latency and high reliability. When absolute state information is available, such as from GPS or another radionavigation or absolute positioning system, absolute and relative localized state information may be integrated. Integration of machine-vision information with information from inertial navigation, LIDAR, and or absolute position systems may be performed using methods that comprise, for example, an adaptive filter, wherein the adaptive filter comprises at least one of a linear filter, a non-linear filter, an adaptive notch filter (including an adaptive notch filter to account for latency cause by rigging), a recursive least squares filter, a least mean squares filter, a Volterra least mean squares filter, a kernel adaptive filter, a spline adaptive filter, an Unscented Kalman Filter ("UKF"), a Urysohn adaptive filter, or a neural network.

As discussed, an SLCS and an attached load may rotate and or may have a heading vector which follows a pendular path relative to a carrier's coordinate space. Relative and or absolute state information developed or accounted for according to the disclosure herein may be used to control or to enhance control of an SLCS or may be provided as telemetry to a carrier or a component within a carrier or to an object or persons on the ground or elsewhere.

As discussed herein, a gain adjustment module and or an autonomous state response module of an SLCS may allow the SLCS, including logical and operational components thereof, to respond to changing circumstances of operation of the SLCS, such as changes in the load, changes in the thrusters, changes in disturbance forces, to provide motor response behavior suited to the then-current circumstances and also to allow a target orientation or position to be achieved quickly and with reduced self-induced cyclic motion or reduced seeking behavior.

Reference is made to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of crane operations, a helicopter sling load, and or search and rescue operations. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and or" unless the content clearly dictates otherwise.

Reference numbers herein comprising a letter, e.g. thruster 1205A, generally refer to one of a plurality of components, e.g. to thruster 1205A and thruster 1205B; one of or a plurality of components may be referred to with a corresponding reference number, without the letter; e.g. thruster 1205, in which case the reference should be understood to encompass any of the components with the corresponding reference number without the letter. When a top-level component referred to herein comprises a sub-component, e.g. suspended load control system 105 ("SLSCS 105") comprising decision and control module 700 in memory 525 and thruster 1205, a reference to the top-level component may refer to one or more of the sub-components performing functions as described further herein; e.g. a reference to SLCS 105 applying thrust to suspended load 115 may also be understood as SLCS 105 and decision and control module 700 in memory 525, executed by processor 520 and implemented by suspended load control system logical components 501 and operational components 900 to activate thrusters 1205 to apply thrust to suspended load 115.

FIG. 1 through FIG. 4 are discussed herein, for example, above.

Figure 12:
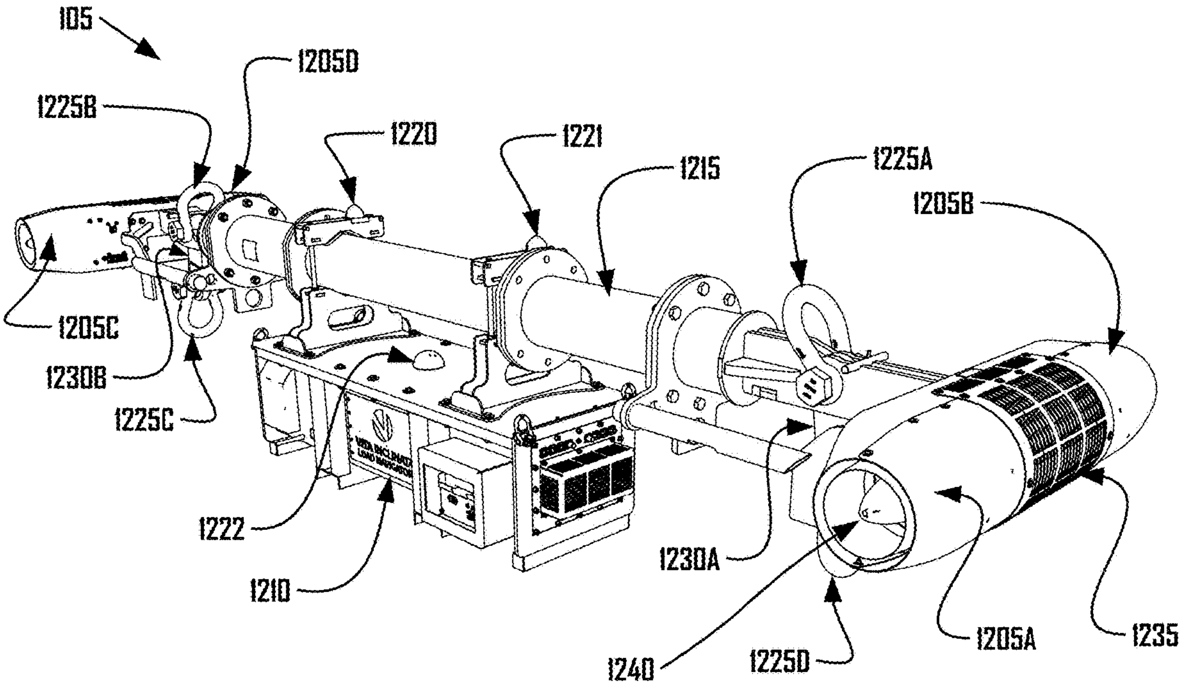
FIG. 12 illustrates a perspective view of an example of an SLCS for heavy lift operations, in accordance with one embodiment.

Referring to FIG. 12, FIG. 12 illustrates SLCS 105 of FIG. 1 through FIG. 4 from a closer vantage. As illustrated in FIG. 12, SLCS 105 may comprise, for example, thruster 1205A, thruster 1205B, thruster 1205C, and thruster 1205D. More or fewer thrusters may be utilized. Thrusters may comprise a cowl or shell which protects one or more EDF or other thruster. Flywheels may be used in place of or in addition to fan-based thrusters. The cowl may be hardened, to withstand impact with the environment. The cowl unit may be made of metal, plastics, composite materials, including steel, stainless steel, fiber reinforced resin, and the like. Thrusters may include air intake 1235, though which air may be drawn, and outlet 1240. Air intake 1235 may comprise one or more screens or filters to prevent entry of some objects into the thruster. EDF in a thruster may comprise blades and motor(s), such as electric motor(s). Electric motors within an EDF may be sealed against dust, sand, water, and debris. As noted, in addition to or in replacement of EDF, alternative sources of thrust may be used, such as, for example, compressed air, hydrogen peroxide jets or thrusters, liquid or solid rocket engines, fans driven by combustion engines, such as jet engines, flywheels, reaction wheels, and the like.

For the sake of convenience in discussing them, thrusters on a first side of an SLCS, such as thrusters 1205A and 1205B may be discussed as a first thruster group while thrusters on a second side, such as thrusters 1205C and 1205D, may be discussed as a second thruster group. The thrusters in each thruster group may propel thrust fluid (such as air) in fixed directions, such as fixed directions opposite each other, e.g. offset by 180 degrees. In other embodiments, a fewer or greater number of thrusters may be used in an SLCS. In other embodiments, the thrusters may be aligned other than offset by 180 degrees, e.g., offset by greater or fewer than 180 degrees, with or without offset along other of the axis. A mechanical steering component may be included to dynamically reposition a thruster. In the illustrated example, EDF in thrusters 1205 comprise asymmetrical fan blades, which produce more thrust when rotated in a first direction relative to a second direction; in this example, to produce thrust in opposing directions out of one thruster group, two EDF are contained in each thruster group, facing opposite directions; e.g. EDF in thruster 1205A and 1205B each rotated in only one direction and produce thrust "outward", out of each thruster, in opposite directions. In alternative embodiments, one symmetrical fan may be contained in a thruster, wherein the one symmetrical fan may be rotated in either direction and produce equivalent thrust in either direction. In alternative embodiments, three or more thrusters may be used, with the thrusters orthogonal to one another or with two of the thrusters parallel to another (as in FIG. 12) and a third thruster orthogonal to the first two (not illustrated). In alternative embodiments, four thrusters maybe used, with each to the thrusters 90 degrees to one another.

In embodiments, thrusters, such a first thruster group, e.g. thruster 1205A and 1205B may move further from or closer to a second thruster group, e.g. thruster 1205C and 1205D. This may be accomplished by mounting the thrusters on a different spreader bar, e.g. different than spreader bar 12015, or by hardware designed for this purpose, e.g. by a spreader bar designed to expand or contract. For example, referring to FIG. 16, SLCS 1605 comprises thruster group 1610A and 1610B secured to litter 1615 with brackets 1620. Thruster group 1610A and 1610B and brackets 1620 may slide along grooves in plate 1625A and 1625B, allowing thruster group 1610A and 1610B to be further or closer together. Changing a distance between the thrusters, and changing this relative to a center of rotation, changes the torque output by the thrusters. Without the hyperparameter discussed herein, such changes might require hard-coded input or might require that the system model estimate the thruster-to-thruster distance, including through the use of other sensor data which may be more complex, which may not update so quickly, which may be less reliable, and the like, compared to use of the hyperparameter.

EDF (or other thrusters) in individual of the thrusters may be activated separately, with different power, to produce thrust vectoring or thrust vector control of an assembly of thrusters. For example, to produce clockwise yaw (relative to looking down on a top of SLCS 105 in FIG. 12), an EDF in the first thruster group, such as thruster 1205B may be activated by itself or in conjunction with an opposing EDF in the second thruster group, such as thruster 1205C. To produce lateral translation of SLCS 105 or to produce lateral force opposing pendular motion, EDF in both thruster groups with a same orientation may be activated, such as thrusters 1205B and 1205D. Simultaneous lateral force and rotational force may be produced.

Information regarding orientation and placement of thrusters, such as that thrusters 1205B and 1205D point in the same direction or that thruster 1205A and 1205D point in opposite directions, may be accounted for by the hyperparameter discussed herein, such as if the angular acceleration used to determine the hyperparameter comprises a direction.

When an SLCS comprises fewer than three EDF (or equivalent thrusters), then control over pendular motion may require first rotating the SLCS to a first direction, then applying a first horizontal thrust vector out of the EDF to cancel a first decomposed component of the pendular motion, and then, if necessary, rotating the SLCS to a second direction, general orthogonal to the first direction (though disturbances or other variation may cause the second direction to not be orthogonal to the first direction), and then applying a second horizontal thrust vector out of the EDF to cancel a second decomposed component of the pendular motion. Use of three or more EDF may allow control over pendular motion without decomposition of the vector components of pendular motion, though may require more parts.

SLCS 105 may be formed of any suitable material such as metal, plastic, composite materials, such as fiber reinforced resin. A sealed hatch or one or more panels may be removed from an SLSC to allow for maintenance and inspection of enclosed logical components 501 and operational components 900.

Load 115 in FIG. 1 through FIG. 4 may comprise one or more people, a litter (e.g. litter 1615), a container, an object, or the like. Load 115 is illustrated as being secured to two points on either side of SLCS 105, such as to bottom shackle 1225C and 1225D, such that load 115 may not easily rotate, independent from SLCS 105, but is more likely to rotate with SLCS 105. A weight of load 115 may change during an operation, such as when all or part of a load is picked up or put down or when a mass falls off of on onto a load. Suspension cable 135 in FIG. 1 through FIG. 4 may be, for example, a braided cable between SLCS 105 and or load 115. A rotational coupling (not numbered), may allow SLCS 105 and load 115 to rotate, without winding up suspension cable 135. Gravitational and other forces from load 115 may be transferred through bottom shackle 1225C and 1225D, into tensile beam 1230A and 1230B, to top shackle 1225A and 1225B, and then to suspension cable(s) 135 (e.g. via a rotational coupling). Tensile beam 1230 may be secured to a spreader bar (not numbered) or other beam between thrusters 1205.

SLCS 105 may comprise a cable entry channel (not illustrated), to receive a suspension cable, such as suspension cable 135. Cable entry channel may be angled inward, toward a cable receiving area. Cable receiving area may form a partially enclosed vertical channel between a fixed jaw and a moveable jaw within SLCS 105. SLCS 105 may comprise springs or another force-applying member to apply a compressive force to close a set of jaws on suspension cable 135, within the partially enclosed vertical channel between a fixed jaw and a moveable jaw. Together, the set of jaws may be understood as a "clamp" and may be referred to as a "jaw" or "jaw system". The jaw system may comprise a fixed jaw and a moveable jaw or a set of levers joined at a fulcrum. The jaw system may hold SLCS 105 on suspension cable 135.

The length of suspension cable 135 may change during an operation, affecting behavior of the suspended load and response required by an SLCS.

Figure 9:
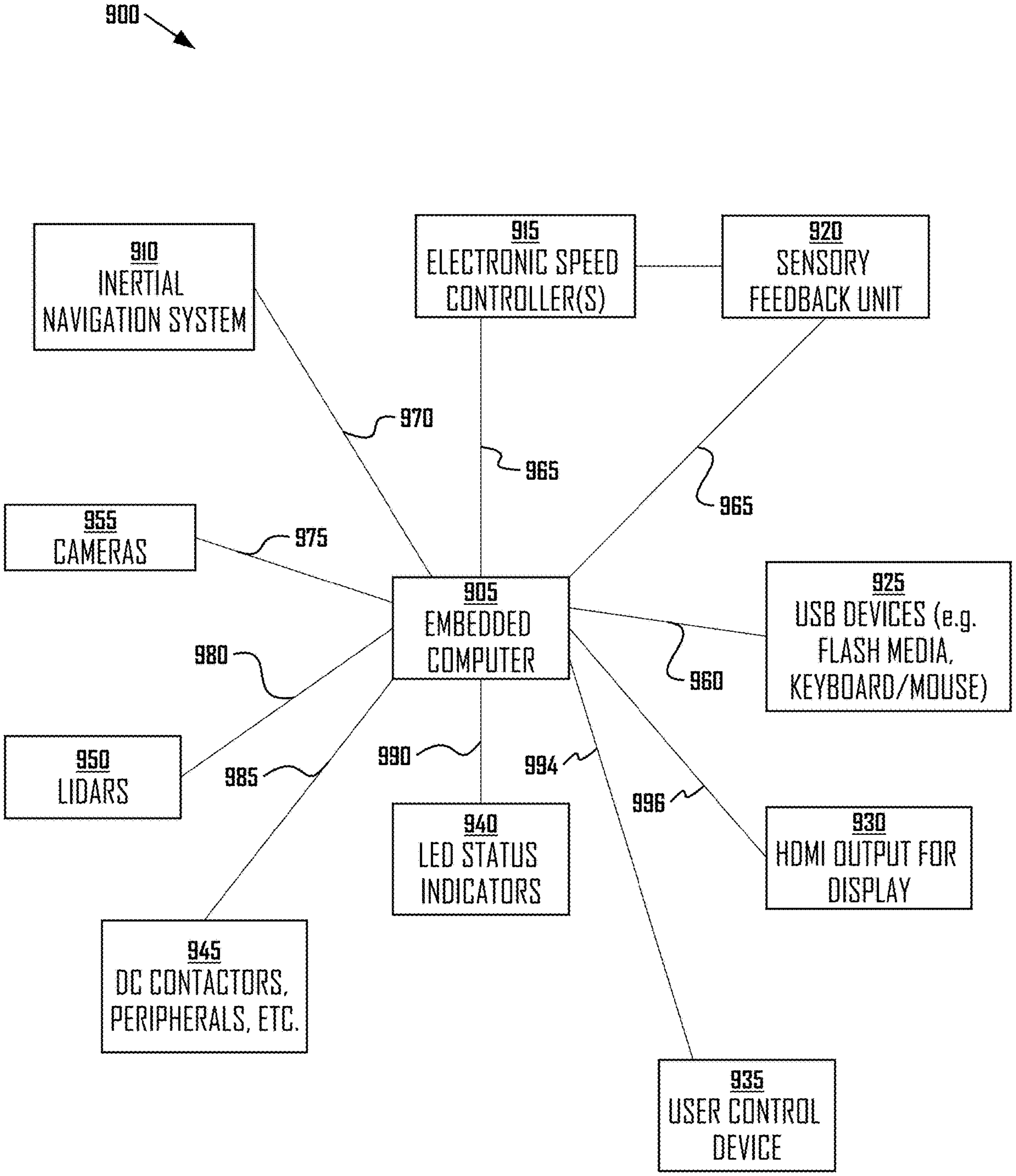
FIG. 9 schematically illustrates electronic computer, hardware, and network connections among operational components of an SLCS in accordance with one embodiment.

Status indicators (not illustrated) may be mounted on various surfaces of the SLCS to aid in visibility and operation of the SLCS from above and below. For example, the SLCS may have external lighting, including visible and infrared (IR) LEDs, such as around the perimeter, to assist in identification of edges and orientation of the SLCS. This may allow for improved identification in hard viewing situations such as inclement weather and low. IR LEDs may be visible to humans using night vision goggles and or to machine systems that can detect visible or IR electromagnetic radiation. During operation, both on the interactive display and the system body itself, LED display indicators may show that the system is active and may convey useful information. LEDs may also convey status of systems and or components of the SLCS. An example of LED lights are illustrated in FIG. 9 as LED status indicators 940.

SLCS 105 may contain and protect logical components 501 and operational components 900, such as computer hardware, such as a computer processor and memory, a power supply, electronic speed controllers, microcontrollers, sensors, and the like. Examples of such computer hardware are discussed in relation to FIG. 9.

The power supply within SLCS 105 may be a single power brick or an array of battery cells wired in series and or in parallel, such as lithium-polymer (LiPo), nickel-metal hydride (NiMH) cells and the like. The batteries may be removable for inspection and or to swap discharged and charged batteries. Batteries may be charged while installed in the SLCS (i.e., without having to remove them) via nodes or a wireless charging system on or in an SLCS that connects to a power supply or charging dock. Batteries may include auxiliary battery(ies) to supply a steady supply of power to the processor even if thrusters draw a relatively large amount of power from main batteries. In embodiments, a carrier from which the SLCS is suspended, such as a helicopter or crane, can provide power through a line extending down the suspension cable to the SLCS. In embodiments, the carrier can provide some power to the SLCS, while the SLCS may obtain other power from an on-board power supply. In various embodiments, the SLCS may be powered by a combination of on-board and remote power. In many environments, all power for the SLCS is contained on board the SLCS, allowing fully autonomous operation without dependence on the availability of external power sources or delivery means.

SLCS 105 may comprise a data link which allows a microcontroller unit or processor to monitor power information including (but not limited to) cell voltage and real-time power dissipation or consumption.

SLCS 105 may comprise one or more computer processors or central processing units (CPUs), such as embedded computer 905, and one or more microcontroller unit (MCUs). In some embodiments, the CPU and MCUs may be mounted to the same printed circuit board (PCB).

SLCS 105 may be made of or comprise a rugged plastic, metal, polymer, or combination thereof, protecting the system from environmental and operational factors such as weather and other operational conditions.

SLCS 105 may contain one or more wireless transceivers, which may comprise separate transmitter(s) and receiver(s), as well as antennas for wireless communication. The transceiver and or wireless antennas may also be mounted to or printed on the same printed circuit board as the processor. The wireless transceivers may comprise access points for Bluetooth, Wi-Fi, microwave, and or radio frequency (RF) transmission and reception. Wireless transceivers may be used to communicate with remote sensors, a remote-control unit, a remote positional unit or target node, a remote interface, and the like, as discussed further herein.

As discussed herein, SLCS 105 may contain a vector navigation unit, which may include an IMU, also referred to as an orientation measurement system. The IMU provides inertial navigation data to a processor, such as from 3 degree of freedom (3 DoF) accelerometers, gyroscopes, magnometer or magnetometer such as a compass, an inclinometer, a directional encoder, a radio frequency relative bearing system, and gravitational sensors, which may comprise microelectromechanical systems (MEMS) sensors. Accelerometers or gyroscopes of or in the IMU may provide sensor data, such as angular acceleration, or a value such as an angular rate which may be convertible into the angular acceleration, used in the hyperparameter.

The IMU may include an integrated processor to provide on-board state estimation that fuses together data from the sensors in the IMU, in which case the IMU may be referred to as an Inertial Navigation System ("INS"). SLCS 105 may comprise or be communicatively coupled to one or more sensors in addition to the IMU. Such additional sensors may comprise, for example, an absolute position measurement system, a proximity sensor, LIDAR sensors and systems (e.g., point, sweeping, rotating, radial, distance, or linear), ultrasonic, and optical sensors such as one or more cameras or infrared (IR) sensors. Proximity sensors may include ground height sensors. The absolute position measurement system may include global positioning system (GPS) sensors. With a processor and memory, the IMU and GPS may also be referred to herein as an INS, such as inertial navigation system 910 of FIG. 9.

Sensors which require a view of a surrounding environment may be placed on or at the surface of SLCS 105. Examples of sensor locations for one or more of the foregoing are illustrated at sensor location 1220, 1221, and 1222 in FIG. 12. Similar sensors and or sensor locations may be on a bottom of SLCS 105. As discussed herein, information from sensors can be used by methods, apparatuses, and or systems to determine state information; the raw data and or determined state information or telemetry data may be provided to remote devices, processes, and humans, such as via wireline or wireless data links.

Additional SLCS sensors may include a strain sensor to gauge load on housings, on EDF(s), on conduits, on an attachment to a suspension cable, or the like. Additional sensors may include a rotational encoder or thruster speed sensor, such as sensory feedback unit 920 in FIG. 9, which may be incremental or absolute, and a shutdown pin presence sensor.

Not illustrated, an arm attached to or part of carrier may be used to deploy, reposition, and or retrieve suspension cable 135 and SLCS 105 (such as when carrier is a helicopter). Such an arm may comprise a winch to lower and hoist suspension cable 135 and SLCS 105. Load 115 and SLCS 105 may be offset from a fall-line beneath such an arm. This offset may be due to wind (whether environmental or from a carrier, such as a helicopter), wave, impacts, or other forces which may act on load 115 and or SLCS 105, change in speed of one or both of load 115 and carrier, and the like.

As discussed herein, one or more computers, such as embedded computer 905, applies algorithms to received sensor data to estimate state information and output a desired system response. For example, data from IMU and GPS may be fused together through non-linear data fusion methods, such as real-time kinetic algorithms ("RTK"), Kalman filters, transfer functions, or Kalman filtration methods, such as an Unscented Kalman Filter ("UKF"), or through complimentary filters or transfer function models to yield optimal state estimates in all degrees of freedom to characterize the system's location and motion in relative or absolute coordinate frames, such as an aircraft or crane relative defined frame or in geodetic space.

Figure 5:
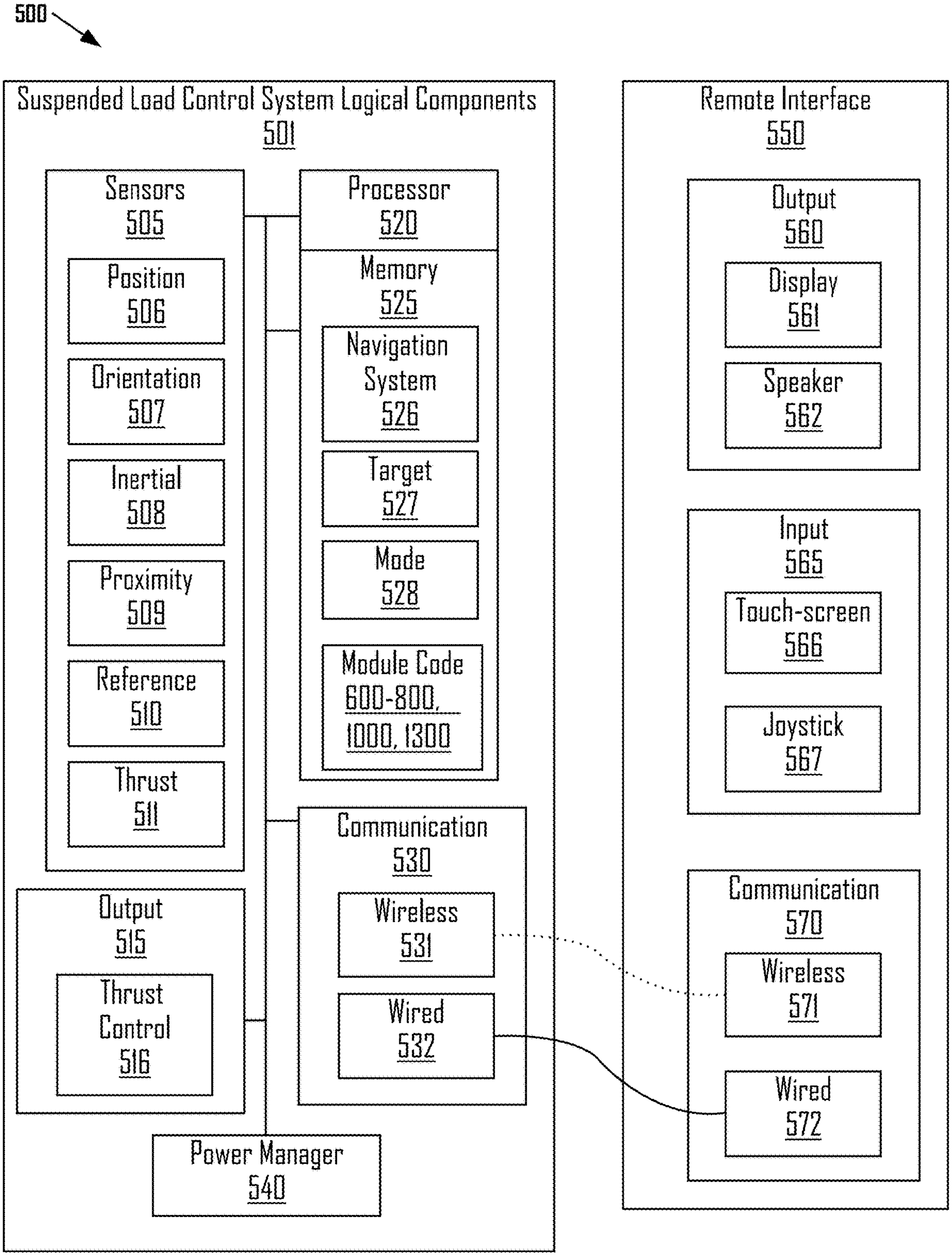
FIG. 5 schematically illustrates an example of operational components of an SLCS, including a remote interface, in accordance with one embodiment.

Examples of components which may be within SLCS 105 and within remote positional sensors or beacons, remote computational units, or target node transceiver devices are discussed further herein, such as in relation to FIG. 5 and FIG. 9.

Carrier 110 in FIG. 1 through FIG. 4 is illustrated as a crane, but represents any carrier.

SLCS 105 and load 115 may follow an oscillation path, e.g. pendular motion of a load which may be cause by movement of and or interaction among carrier 110, load 115, SLCS 105, wind, impacts, other external forces, and the like. Load 115 and or SLCS 105 may also rotate or yaw about suspension cable 135. As discussed, such yaw and or pendular motion may cause problems for transport and or recovery of load 115 by carrier 110. SLCS 105 may be able to estimate system information, including such motion, disturbance forces, and reduce or eliminate such undesirable motion through activation of thrusters.

Axes 120 illustrate a coordinate system. The coordinate system may represent, graphically, for the reader of this paper, state information developed by data fusion and telemetry output module 800 or accounted for by autonomous state response module 1300 and the hyperparameter discussed herein.

As discussed further herein, data fusion and telemetry output module 800 may perform object recognition to identify carrier 110 and an orientation of carrier 110. Determination of the orientation of carrier 110 325 may allow data fusion and telemetry output module 800 to determine that carrier 110 has a center around which carrier 110 may rotate.

As discussed further herein, data fusion and telemetry output module 800 may also determine a height of carrier 110 above SLCS 105. This determination may be based on one or more of LIDAR, object recognition, optical, IR, or microwave range or distance measurement, including from one or more data sources (such as stereo cameras), using signal time-of-flight information, detection of encoded laser light, orientation, position, and movement information input to a UKF system models, or otherwise. As discussed further herein, data fusion and telemetry output module 800 may also determine a relative offset between SLCS and a slung point on carrier.

Data fusion and telemetry output module 800 may also determine change in the foregoing information over time, allowing data fusion and telemetry output module 800 to determine an oscillation path or pendular motion of SLCS 105 and load 115.

Data fusion and telemetry output module 800 may determine local relative position, orientation, movement over time, change in movement over time of SLCS 105 and carrier 110, mass of SLCS 105 and load 115, distance below carrier (or a slung point on carrier), all from data obtained locally by SLCS 105. Similar local relative state information of load 115 may be developed with information from sensors oriented toward load 115. Some of such information may also be referred to herein as an "operating point value".

As discussed herein, data fusion and telemetry output module 800 or another module may integrate this local relative state information with absolute position information, such as from a GPS or other geolocation or radionavigation systems. In this way, data fusion and telemetry output module 800 may develop critical local and absolute state information of an SLCS, a load, and or a carrier.

As discussed herein, autonomous state response module 1300 may determine the hyperparameter discussed herein, wherein the hyperparameter accounts for state information such as, for example, wherein an orientation of the thruster, a thrust output of the thruster, a mass of the load, a distance between the thruster and a second thruster, a distance between the thruster and a center of rotation of the load, and a disturbance force on the SLCS.

As discussed herein, communication systems, such as communication 530 module within SLCS logical components 501, may communicate local and or absolute telemetry information to an interactive display or remote interface of an SLCS or to other systems, such as a control system for a hoist in or coupled to an arm.

FIG. 5 schematically illustrates logical components of SLCS 500 including SLCS logical components 501 and remote interface 550 in accordance with one embodiment.

Referring to FIG. 5, interactive display or remote interface 550 may be a computational unit that can be self-powered or hardwired into an airframe or other carrier or which may be carried by an operator, such as on the ground. Display or remote interface 550 receives data, such as telemetry data, from an SLCS, e.g., wirelessly. The data from the SLCS may be parsed and converted to visual cues or visual information and displayed on display 561.

An example of an embodiment of a user interface (UI) of interactive display or remote interface 550 may represent a location of an SLCS and a load, height or distance of the SLCS below the carrier. As discussed further herein, the length of suspension cable below the carrier may be calculated by, for example, data fusion and telemetry output module 800, based solely on sensor information generated at the SLCS, such as SLCS 105. Such a display or remote interface 550 may further communicate the height or distance of the SLCS and or load above the ground and or may further communicate the absolute position of the carrier and or of the SLCS and or load, such as "LAT: 44.244167 LON: 7.76944".

The interactive display may also communicate an operator's desired command states to an SLCS. Desired command states may be communicated verbally, by touching (including repeated or sustained touch) the interactive display, by dragging objects on the interactive display, by pushing buttons, whether graphical buttons on a touchscreen or physical buttons, by entry of text commands, through a keyboard, and the like.

The interactive display or remote interface 550 is in communication with SLCS logical components 501 via communication systems 570, which may be wireless 571 or wired 572. Output 560 from remote interface 550 may include information displayed on a screen 561, and audio cues 562. Input 565 to remote interface 550 to control the SLCS may include commands conveyed through a touchscreen 566, a joystick 567, a microphone, a camera, button 425, or the like. In various embodiments, remote interface 550 may comprise one or more physical and or logical devices that collectively provide the functions described herein. Another example of an embodiment of remote interface 550 is illustrated and discussed in FIG. 11.

As illustrated in the embodiment illustrated in FIG. 5, within SLCS logical components 501 are sensor suite 505, which may include position sensors 506, orientation sensors 507, inertial sensors 508, proximity sensors 509, reference location sensors 510, and thrust sensors 511. Examples of embodiments of such sensors are discussed further herein, such as in relation to IMU, absolute position measurement systems, and as discussed in relation to FIG. 9, such as inertial navigation system 910, cameras 955, LIDARS 950, DC contactors, peripherals, etc. 945, and sensory feedback unit 920.

SLCS processor 520 may include one or more processor and or microcontrollers. An example of a processor and or microcontroller is embedded computer 905 of FIG. 9.

SLCS memory 525 may generally comprise a random-access memory ("RAM"), a read only memory ("ROM"), and a permanent non-transitory mass storage device, such as a disk drive or SDRAM (synchronous dynamic random-access memory).

SLCS memory 525 may store program code for modules and or software routines, such as, for example, navigation system 526, operational module 600, decision and control module 700, data fusion and telemetry output module 800, gain adjustment module 1000, and autonomous state response module 1300 as well as data or information used by modules and or software routines, such as, for example, target data 527, and mode or command state information 528.

Memory 525 may also store an operating system or the like. These software components may be loaded from a non-transient computer readable storage medium into memory 525 using a drive mechanism associated with a non-transient computer readable storage medium, such as a floppy disc, tape, DVD/CD-ROM drive, memory card, or other like storage medium. In some embodiments, software components may also or instead be loaded via a mechanism other than a drive mechanism and computer readable storage medium (e.g., via a network interface).

Memory 525 may also comprise a kernel, kernel space, user space, user protected address space, and a datastore.

Memory 525 may store one or more process (i.e., executing software application(s)). Process may be stored in user space. A process may include one or more other process. One or more process may execute generally in parallel, i.e., as a plurality of processes and or a plurality of threads.

Memory 525 may further store an operating system and or kernel. The operating system and or kernel may be stored in kernel space. In some embodiments, the operating system may include a kernel. The operating system and or kernel may attempt to protect kernel space and prevent access by certain of the processes.

The kernel may be configured to provide an interface between user processes and circuitry associated with embedded computer 905. In other words, the kernel may be configured to manage access to embedded computer 905, a chipset, I/O ports and peripheral devices by processes. The kernel may include one or more drivers configured to manage and or communicate with elements of operational components of SLCS 500 and 900 (i.e., embedded computer 905, chipset, I/O ports and peripheral devices).

Processor 520 may also comprise or communicate via a bus and or a network interface with memory 525 or another datastore. In various embodiments, such a bus may comprise a high-speed serial bus, and a network interface may be coupled to a storage area network ("SAN"), a high speed wired or wireless network, and or via other suitable communication technology.

SLCS logical components 501 may, in some embodiments, include many more components than as illustrated. However, it is not necessary that all components be shown in order to disclose an illustrative embodiment.

The data groups used by modules or routines in memory 525 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Communication system(s) 530 may include wireless system(s) 531 such as the wireless transceiver, and wired system(s) 532. SLCS output 515 includes thrust control 516 via thruster controllers. Power managing systems 540 regulate and distribute the power supply from, e.g., the batteries or remote power supply. One or more data connectors, data buses, and or network interfaces may connects the various internal systems and logical components of the SLCS. Examples of data connectors and or data bus are illustrated in FIG. 9, at data connector elements 965 to 996.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), the Internet, or any radio frequency communication technology. Data from an SLCS may be of very low bandwidth and may not be restricted to a frequency or communication protocol. In a distributed computing environment, modules can be located in both local and remote memory storage devices. As schematically illustrated in FIG. 5, SLCS logical components 501 and remote display interface 550 may be connected by wired or wireless networks.

An SLCS may work with a remote positional unit or target node of a suspended load control system in accordance with one embodiment. The remote positional unit or target node may comprise an external sensor suite or beacon configured to communicate, such as wirelessly, with the SLCS as a positional reference. If the SLCS is considered the primary sensor suite, a secondary sensor suite location can be the platform or carrier from which the cable is suspended, and a tertiary sensor suite location can be a location of interest for the load (e.g., for positioning to obtain or deliver the load).

A remote positional unit can include a positional transceiver configured to communicate with the SLCS via its wireless transceiver and provide a positional reference. For example, a remote positional unit can be attached to a helicopter ownship or crane below which a load may be suspended.

In some embodiments, the remote positional unit or target node may be made of durable polymer or plastic, large enough to fit into a hand. The remote positional unit or target node may have an external antenna. The remote positional unit or target node may be attached to, e.g., the crane or helicopter by magnets, bolts, or any other attachment mechanism. The remote positional unit or target node may be dropped to a location on the ground or attached to, e.g., a life preserver or other flotational device, a rescuer, a load to be picked up, a location for a load to be delivered, or an operational specific location.

Aspects of the system can be embodied in a specialized or special purpose computing device or data processor that is specifically programmed, configured, or constructed to perform one or more of the computer-executable instructions explained in detail herein, such as embedded computer 905. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices. As schematically illustrated in FIG. 5, SLCS logical components 501 and remote display interface 550 are connected by a wired or wireless network.

Figure 6:
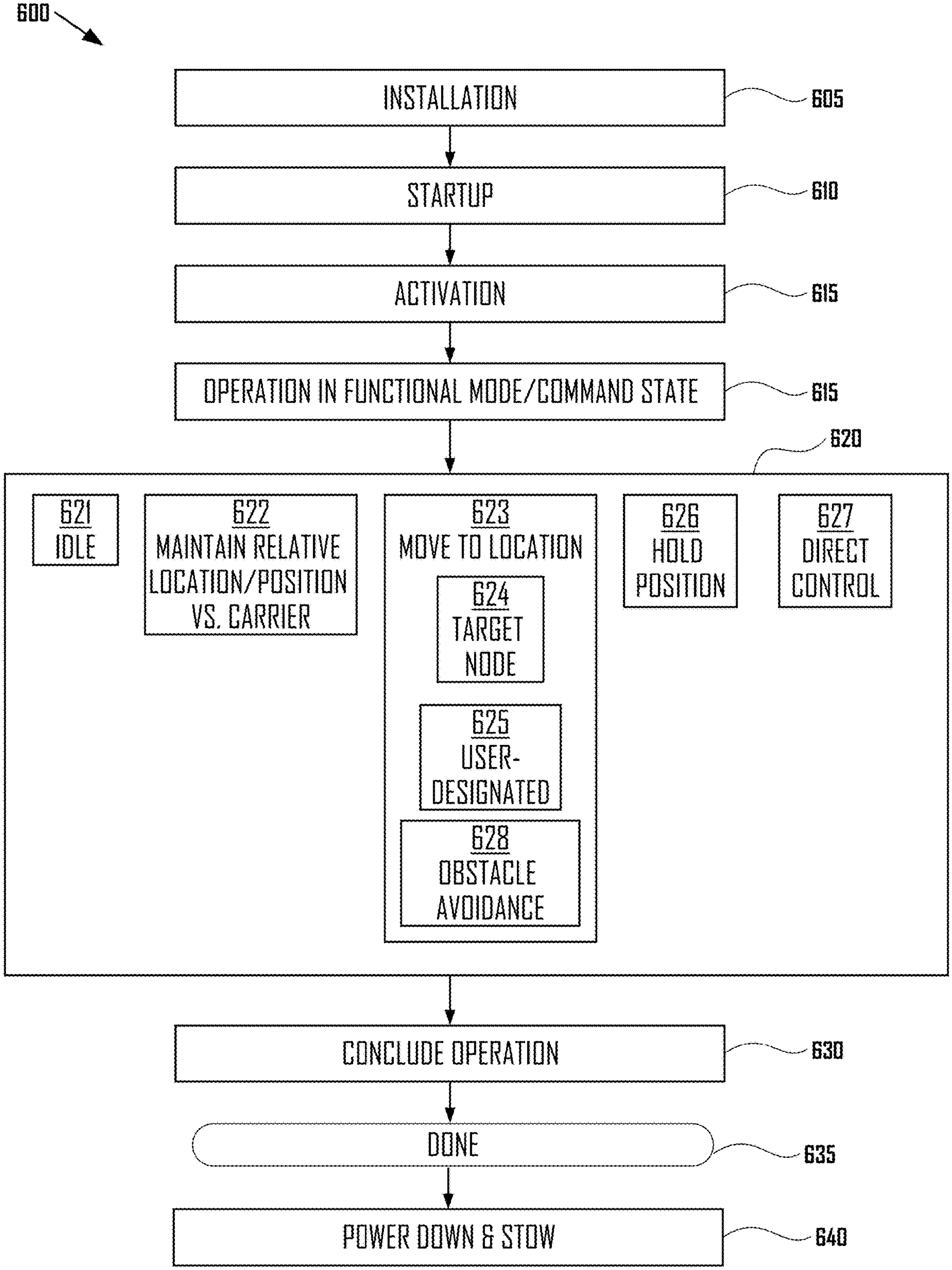
FIG. 6 illustrates an operational module of an SLCS including multiple modes or command states in accordance with one embodiment.

FIG. 6 illustrates an operational module 600 of a suspended load control system ("SLCS") including multiple modes or command states in accordance with one embodiment. Instructions of, or which embody, operational module 600 may be stored in, for example, memory 525, and may be executed or performed by, for example, processor 520, as well as by electrical circuits, firmware, and other computer and logical hardware of SLCS with which operational module 600 may interact. In embodiments, computer processors and memory to perform some or all of operational module 600 may be remote from SLCS, such as in an auxiliary computer in, for example, a carrier.

In block 605, the SLCS apparatus may be installed onto a load and or cable from which the load and or SLCS will be suspended. The SLCS apparatus need not be powered for installation.

In block 610, the SLCS in the apparatus may be started up and operational module 600 activated, if it is not already operating. In some embodiments, operational module 600 may be initialized by the press of a button or turn of a key located on the SLCS. Near the accessible external button or key which may initialize operational module 600, another button may be present that allows for immediate system shut down when pressed or activated. In addition to the initialization interface, operational module 600 may be initialized by an operator not directly next to the system. One or more external operators, including but not limited to an operator on the ground or at the end of the cable, may initialize operational module 600 by pressing a button on one or more interactive displays 650 linked wirelessly to operational module 600.

One or more modules or components of a complete SLCS, such as physically separated control unit, thruster, and the like, may be started up in block 610 and may be paired to function together. During block 610, operational module 600 may determine a relative orientation of thrusters which operational module 600 is to control. This determination may be based on sensor information from the thrusters, such as a compass heading sampled from each thruster. This determination or this accounting by the hyperparameter may be performed to adjust for thrusters which are not parallel to one another, as may be the case when a modular SLCS is deployed on an irregular load, such as a rope or webbing enclosed load, and the thrusters may not be parallel. This determination may be used in, for example, block 745, with respect to thruster mapping and determination of an actuator mix. This determination may not be necessary when the SLCS is in a rigid frame and the thrusters may be presumed to be, for example, parallel to one another. This determination may produce an error condition if the thrusters are not within an acceptable orientation range. Alternatively, a relative orientation of thrusters and mapping of thrusters and determination of actuator mix may be accounted for by the hyperparameter discussed herein.

In block 615, operational module 600 is activated in and or receives a functional mode or command state selected by the operator.

In block 620 and a functional mode or command state, operational module 600 may perform or call suspended load control decision and control module 700 as a subroutine or submodule, to implement a functional mode or command state. The functional modes or command states of the system may be and may perform the following:

Idle mode 621: all internal systems of the SLCS are operating (e.g., operational module 600 observes motion of the SLCS and calculates corrective action), but thrusters are shut off or maintain an idle speed only, without action to affect the motion of the load.

Maintain relative position relative to ownship mode 622: stabilizes the SLCS with respect to a slung origin point. For example, when the SLCS is suspended with a load below an arm of a helicopter or a trolly on a crane, the SLCS will stay directly below the arm or trolly. Maintain relative position relative to ownship mode 622 localizes the ownship motion and performs the corrective actions necessary to critically damp any other suspended load motion. If the ownship is traveling at a low speed, maintain relative position relative to ownship mode 622 will couple the velocity so the two entities move in unison. Upon a disturbance to the load, maintain relative position relative to ownship mode 622 provides thrust in the direction of the disturbance to counteract the disturbance, eliminating the swing.

Move to/stop at position mode 623: will stabilize an SLCS to a fixed position, counteracting the influence of the weather or small movements of the helicopter or other carrier. This mode has the effect of trying to eliminate all motion. The operator may send a desired target position to the SLCS via the remote interface 650. This may be accomplished in at least two ways:

Target node position 624: The operator may place an SLCS remote positional unit or target node 510 at the desired lowering location. The target node 510 will communicate wirelessly with the SLCS to indicate the desired position, and the SLCS responds by maneuvering to the desired location. The remote interface 550 UI may receive and display the location information of both entities.

User-designated position 625: The operator may use remote interface 550 UI to send a designated position (e.g., latitude and longitude coordinates) as a commanded location to the SLCS. The system will then steadily direct the suspended load toward the desired position. The system will simultaneously send feedback to the remote interface 550 UI regarding position and distance information.

Hold Position mode 626: will resist all motion of an SLCS and maintain current position and or orientation independent of the ownship's motion. This mode has the effect of eliminating or dampening all motion. This mode has conditional responses respectively to ownship speed, safety factors, and physical constraints.

Direct control mode 627: Joystick or other direct operation of the SLCS in three degrees of freedom. Though operational module 600 is entirely closed-loop and does not require external control during operation, there may be an option for user control. The operator may be able to directly control positioning, rotation, and thruster output level.

Obstacle avoidance module 628 module: receives and processes sensor information such as to i) to equalize the distance between sensor locations, such as at thrusters and objects, such as obstacles, sensed in the environment or ii) to measure or receive geometry of a load, measure geometry of obstacles sensed in the environment, determine or receive the position, orientation, and motion of the load, and negotiate the load relative to the obstacle.

In block 630, the operator may complete the operation and retrieve the SLCS apparatus.

In done block 635, operational module 600 may be shut down, such as by an interrupt condition, such as by pushing a button on the interactive display or by pressing a button on the center module itself. At done block 635, operational module 600 may exit or return to another process which may have called it.

At block 640, if the SLCS apparatus includes collapsible propulsion arms or the like, they can be folded up. The load may be detached from a load hook or bottom shackle 1225C or 1225D and the SLCS apparatus may be removed from the suspension cable, such as by being detached from hoist ring or top shackle 1225B or 1225A. The SLCS may then be connected to a charger, stowed, or the like.

Figure 7:
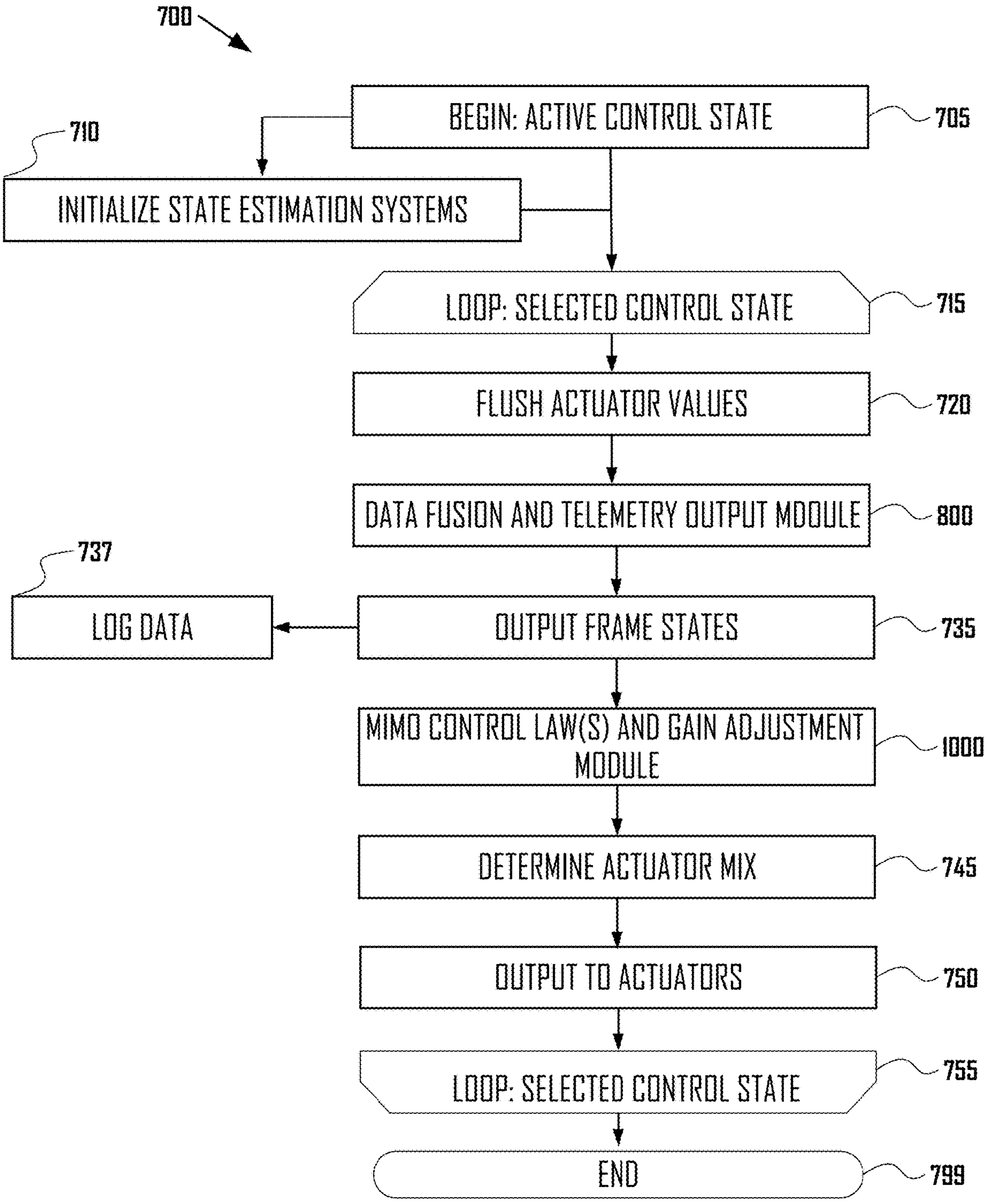
FIG. 7 illustrates a decision and control module of an SLCS in accordance with one embodiment.

FIG. 7 illustrates decision and control module 700 of an SLCS in accordance with one embodiment. Instructions of, or which embody, decision and control module 700 may be stored in, for example, memory 525, and may be executed or performed by, for example, processor 520, as well as by electrical circuits, firmware, and other computer and logical hardware of SLCS with which decision and control module 700 may interact. In embodiments, computer processors and memory to perform some or all of decision and control module 700 may be remote from SLCS, such as in an auxiliary computer in, for example, a carrier.

Decision and control module 700 may operate in a loop to develop relative and absolute telemetry information, send this data to remote locations, perform a set of calculations to determine the most desired response, then send the desired response to the thrusters, for example, to mitigate pendular motion or swing of the cable and suspended load, rotation of the SLCS and suspended load, or otherwise control a suspended load during operations. This process may operate in a continuous loop as long as the system is powered on and a suitable command state is active. This process may operate with data received only from sensors in an SLCS, such as SLCS 105.

In block 705, an SLCS has been deployed, such as onto a suspension cable, has been activated, and decision and control module 700 begins active control state, such as upon being powered on, initialized, or otherwise commanded, either by a user or another process, such as operational module 600. At block 710, if newly activated, decision and control module 700 may initialize state estimation systems.

Begin loop block 715 to closing loop block 755 iterate over a command state, such as one selected in block 620 of operational module 600.

In block 720, decision and control module 700 may flush actuator values, e.g. values sent to actuators, such as EDFs. This may ensure that old values do not contaminate a then-current process loop.

Figure 8:
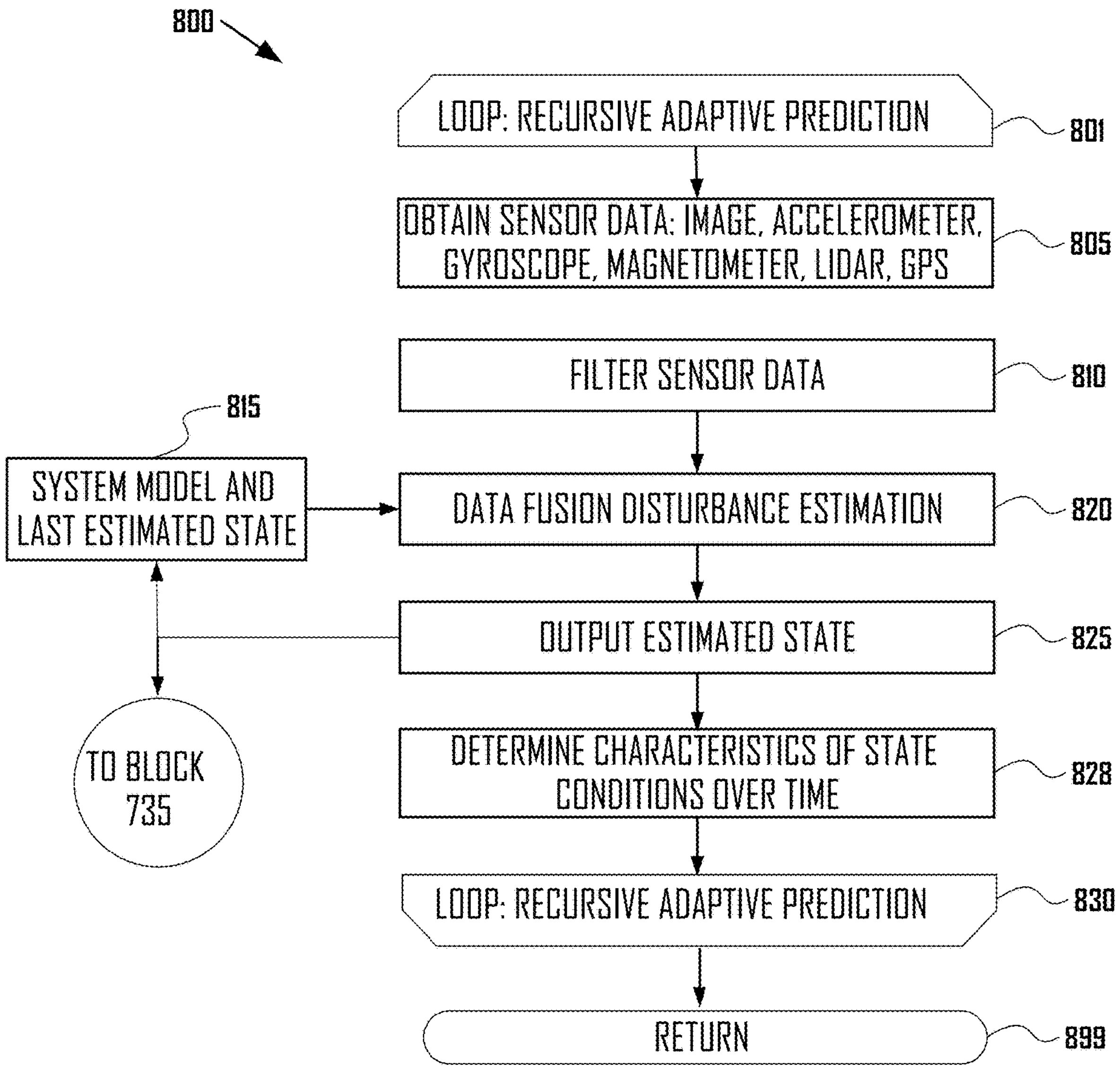
FIG. 8 illustrates a data fusion and telemetry output module of an SLCS, in accordance with one embodiment.

At block 800, decision and control module 700 may call or enter data fusion and telemetry output module 800, discussed further in relation to FIG. 8. In overview, data fusion and telemetry output module 800 fuses local motion-based and absolute sensor information to create a deterministic state estimation of state data of the SLCS and carrier coordinate frame. In overview, data fusion and telemetry output module 800 is updated with most recent values from the sensory suite onboard the SLCS. These values may be obtained in a separate process thread, separate from data fusion and telemetry output module 800. One or more of such state estimates may also be referred to as an, "operating point value". The state estimates are passed to state estimation algorithms and to gain adjustment module 1000, in which data fusion and linear and or non-linear state estimation is implemented. In an embodiment, data fusion and telemetry output module 800 calls or performs logic of autonomous state response module 1300 and determines the hyperparameter discussed herein. The hyperparameter discussed herein may be an, "operating point value". Please see, for example, data fusion and telemetry output module 800.

At block 735, decision and control module 700 may output updated frame states, as may have been received from block 815 and 825 of data fusion and telemetry output module 800. The updated frame states may comprise the hyperparameter. The updated frame states may be logged at block 737.

At block 1000, decision and control module 700 may call or enter gain adjustment module 1000 and pass the updated frame states of block 735 to multi-input multi-output ("MIMO") control laws and gain adjustment module 1000. The MIMO control laws may determine an optimal, quantified, correction force based on weighting of severity of current states, and decides how the SLCS should move or exert force to achieve the determined thrust and orientation of the SLCS set by the user-selected functional mode or command state. For example, weighted control laws may include proportional integral derivative ("PID") controllers with respect to both position and motion. Between the two, severity of motion may dominate relative to position. Control methods weighing cost in terms of energy use may also be considered, as well as additional feedback from past output control to actuators 750.

Gain adjustment module 1000 may adjust a gain of a thrust control signal, to thereby dynamically adapt control of torque or lateral thrust to adapt to changing circumstances, such as a change in the mass or rotational inertia of a load, changes in disturbance forces, to allow an operator to control an SLCS and a load under changing circumstances, to reduce self-induced cyclic motion, to decrease time required to obtain a target orientation, to reduce energy used to obtain or maintain the target orientation, and the like. Gain adjustment module 1000 may call autonomous state response module 1300, which may determine the hyperparameter discussed herein.

At block 745, determination of actuator mix may be determined, e.g. which thruster to activate and how much. This may be determined according to a matrix which receives vectors from the MIMO control laws and determines corresponding actuator values. Net thrust output is mapped in real-time through encoders and load cells. The actuator mix may be informed by the hyperparameter which, if the angular acceleration includes direction, may be used to identify which thrusters point in which directions, such that when a user or command state desires a rotation or thrust in a particular direction, the system knows which thrusters to activate to achieve the desired rotation or direction.

At block 750, decision and control module 700 may output instructions to the actuators to activate them according to the actuator mix determined in block 745. The result may implement a dynamic response in the form of thrust counteracting unwanted motion or thrust to achieve a desired motion.

In closing loop block 755, decision and control module 700 may return to opening loop block to continue iterating over the then-current command state until an exit condition occurs. Exit conditions may include, for example, achieving an objective, such as obtaining or becoming proximate to a location, obtaining a location for a period of time, obtaining a location and receiving an acknowledgment signal, occurrence of an error, or receiving an instruction to exit.

At end block 799, decision and control module 700 may exit or return to another process. The process may be unmanned and automated aside from the high-level operator-selected functional control modes. The net output is a force to control or stabilize a suspended load.

FIG. 8 illustrates data fusion and telemetry output module 800, in accordance with one embodiment. Instructions of, or which embody, data fusion and telemetry output module 800 may be stored in, for example, memory 525, and may be executed or performed by, for example, processor 520, as well as by electrical circuits, firmware, and other computer and logical hardware of SLCS with which data fusion and telemetry output module 800 may interact. In embodiments, computer processors and memory to perform some or all of data fusion and telemetry output module 800 may be remote from SLCS, such as in an auxiliary computer in, for example, a carrier.

In data fusion and telemetry output module 800, local motion-based sensor and absolute position sensor information is fused to create a deterministic state estimation in a coordinate frame of an SLCS and carrier. An example of a data fusion and disturbance estimation algorithm is an adaptive filter. The adaptive filter may comprise at least one of a linear filter, a non-linear filter, an adaptive notch filter, a recursive least squares filter, a least mean squares filter, a Volterra least mean squares filter, a kernel adaptive filter, a spline adaptive filter, an Unscented Kalman Filter, a Urysohn adaptive filter, or a neural network. The adaptive filter fuses data sources from multiple measurement devices with a numerical model to yield a representative state of the coordinate frame of SLCS and carrier. One or more values of the representative state may also be referred to herein as an, "operating point value". In an embodiment, data fusion and telemetry output module 800 may perform some or all of logic of autonomous state response module 1300, e.g. to determine the hyperparameter.

When performed over time, integrals of subsequent representative states may be used to identify rotational and pendular motion, such as rotation of an SLCS about a suspension cable and an oscillation path of an SLCS, such as oscillation path 237.

Kalman filters produce a predicted future state based a past state and a joint probability distribution of a series of measured values in a timespan; the values often contain statistical noise and other inaccuracies. Past values may be discarded and the predicted state then compared to new measured values to produce a new predicted future state. However, Kalman filters may be limited to linear systems. For nonlinear systems, in which non-linearity occurs in either or both the process model or observation model, a Kalman filter may provide poor performance when covariance is propagated through linearization of the underlying non-linear model(s). To address this, an adaptive model may be used, such as an Unscented Kalman Filters ("UKF"), UKF use a deterministic sampling technique, unscented transformation, to pick a minimal set of sample points, which may be referred to as sigma points, around a mean. The sigma points are then propagated through the non-linear functions, from which a new mean and covariance estimate is formed.

An adaptive system model, such as a UKF, may then recursively estimate varying parameters of the then-current system model, including mass of SLCS and load, cable length, rotational inertia of SLCS and load, movement, position, and rotation of the SLCS and load, and movement, position, and rotation of the carrier. Inertial based measurements are sent to disturbance estimator matrices of a filter, from which wind force and relative SLCS and helicopter motion may be estimated.

These state parameters of the adaptive system model may not be "hard-wired" into data fusion and telemetry output module 800, but may be dynamically determined by data fusion and telemetry output module 800. For example, when a load comprises only an empty litter weighing thirty-five pounds, the estimated mass of SLCS and load is much less than when the litter is holding a person who weighs two-hundred pounds. The behavior of an SLCS in activating the fans to deal with the dynamic behavior of the lighter load is very different than the behavior of the SLCS to deal with the heavier load and, generally, involves lighter fan actuation. If it did not, and if the SLCS were not able to dynamically determine the mass of the SLCS and load and the other state parameters, the SCLS would not be able to control the lighter load, but may "overdrive" it and make control of the suspended load less likely. If the SLCS were not able to dynamically determine the hyperparameter and or the mass of the SLCS and load, the other state parameters, and the disturbances, the SLCS would not be able to transition from controlling an unweighted litter to controlling a litter containing a person, as occurs during use of an SLCS. Similarly, the estimated length of the cable and or of inertia has a large effect on pendular motion and how to control it. Systems addressed to control of autonomous vehicles are not known to include system models as described herein, which include continuous and dynamic determination of the hyperparameter or parameters such as mass of SLCS and load, cable length, rotational inertia of SLCS and load, movement, position, and rotation SLCS, movement, position, and rotation of the carrier, and estimates of disturbance forces, such as wind force, impacts, and relative SLCS and helicopter motion.

Other closed-loop control methods include fuzzy-tuned proportional, integral, and derivative feedback controllers with bidirectional communication and control methods including deep learning neural nets.

As noted, in an embodiment, data fusion and telemetry output module 800 may call or perform all or some logic of autonomous state response module 1300, to determine the hyperparameter or normalized moment of inertia. The hyperparameter may account for various elements of the system model and a state of the SLCS, such as, for example, an orientation of thrusters, thrust output of the thrusters, a mass of the load, a distance between the thrusters, a distance between the thrusters and a center of rotation of the load, and disturbance forces on the SLCS.

At opening loop block 801 through closing loop block 830, data fusion and telemetry output module 800 estimates a state of a coordinate system based on measured sensor values, iteratively determines a new estimated future state based on new measured values, and performs an integral of successive state values to identify rotation and pendular motion.

At block 805, data fusion and telemetry output module 800 obtains sensor data, such as image data, accelerometer, gyroscopic, magnetometer, LIDAR, and, if available, GPS data. Image data may comprise object detection, such as detection of a helicopter or other carrier, as well as components of such an object, such as identification of a cabin and tail. Image data and object detection may also comprise identification of optical flow of such images or pixels in successive frames. Accelerometer data may comprise 3-degree of freedom ("3 DoF") acceleration data in a sensor coordinate frame. Gyroscope data may comprise 3 DoF angular acceleration data in the sensor coordinate frame. Magnetometer data may comprise 3 Degree of Freedom ("DoF") magnetic field data in the sensor coordinate frame. LIDAR data may comprise point, sweep, rotating, radial, distance, and or linear data which measures distance and or angle relative to objects, the ground, and or water.

At block 810, data fusion and telemetry output module 800 may filter the sensor data, such as to eliminate values which are errors or outside of an allowed range in both time and frequency domains. For example, values not consistent with a sample time range or not consistent with relevant frequencies may be filtered out. For example, suspension cables may be subject to oscillatory and vibratory frequencies; some of such frequencies may be longer than a plausible length of the suspension cable, may be present in sensor data, and may be filtered out.

In an embodiment, data fusion and telemetry output module 800 may call or perform logic of autonomous state response module 1300, for example, to determine the hyperparameter. As discussed herein, in an embodiment, the hyperparameter may account for one or more elements of the estimated state, e.g. an orientation of thrusters, thrust output of thrusters, a mass of the load, a distance between thrusters, a distance between thrusters and a center of rotation of the load, and a disturbance force on the SLCS. Elements of the estimated state accounted for by the hyperparameter may not need to be determined by the system model.

At block 815, data fusion and telemetry output module 800 may feed the system model and its past estimated or initialization state to the data fusion disturbance estimate model, such as into a system model, to be fused with then-current sensor data. As noted, the system model may include, and may therefore determine as an estimated state, one or more of the hyperparameter, a mass of load and SLCS, a cable length, a rotational inertia of load and SLCS, a fan and actuation force of the SLCS, rotational motion of the SLCS, pendular motion of the SLCS, and movement of a carrier and or of a load over time through an absolute coordinate space.

At block 820, data fusion and telemetry output module 800 may determine a new then-current estimated state, based on the system model, last estimated state, and the then-current sensor data. Inertial based measurements are sent to disturbance estimator matrices of a filter, from which disturbances forces, such as wind force and relative SLCS and helicopter motion, may be estimated. As noted, the hyperparameter may account for disturbance forces and may reduce, eliminate, or change the method of calculation of data fusion disturbance estimation in block 820.

Estimation of state conditions such as the hyperparameter, mass of load and SLCS, cable length, rotational inertia of load and SLCS, fan and actuation forces of the SLCS, rotational motion of the SLCS, pendular motion of the SLCS, and movement of a carrier and or load over time through an absolute coordinate space and disturbance estimations, such as wind force and relative SLCS and helicopter motion, are not know to be practiced by previous control systems for unmanned vehicles.

At block 825, data fusion and telemetry output module 800 may output the then-current estimated state. This may be output to, for example, a record accessed by block 735 of decision and control module 700 and or to a record accessed by block 815 to be fed into the next iteration, if any, of the data fusion disturbance estimate model.

At block 828, data fusion and telemetry output module 800 may determine characteristics of state conditions over time, such as rotation or pendular motion of SLCS, movement of a carrier over time through an absolute coordinate space, and the like. Such characteristics may be determined by determining integrals of or performing other calculus on such state conditions over time.

At closing loop block 830, data fusion and telemetry output module 800 may return to opening loop block 801, unless or until an exit condition occurs.

At end block 899, data fusion and telemetry output module 800 may exit or return to another process.

FIG. 9 schematically illustrates electronic computer, hardware, and network connections among operational components 900 of a suspended load control system, according with one embodiment. Operational components 900 may be understood as implementing SLCS logical components 501.

Embedded computer 905 may be a computer processor or central processing unit (CPU). The processor may be an embedded system including a signal board computer and one or more microcontroller units ("MCUs"). The CPU and MCUs may be contained within a housing in which data link and electrical connections may be made, such as connections 960 through 994. Embedded computer 905 may comprise computer memory, such as SLCS memory 525.

Connection 970, which may be a serial data connection, may connect embedded computer 905 with inertial navigation system 910. Inertial navigation system 910 may comprise the IMS and GPS, discussed herein.

Connection 975, which may be a gigabit ethernet data connection, may connect embedded computer 905 with one or more optical sensors 955, such as visible light, IR, and other cameras, as discussed herein.

Connection 980, which may be a UDP over gigabit ethernet data connection, may connect embedded computer 905 with one or more LIDAR 950 systems, as discussed herein.

Connection 985, which may be a general purpose, input-output connection, may connect embedded computer 905 with one or more DC contactors, peripherals 945, and the like.

Connection 990, which may be a pulse width modulated electrical connection, may connect embedded computer 905 with one or more LED status indicators 940.

Connection 994, which may be WiFi or wired ethernet UDP/TCP data connection, may connect embedded computer 905 with one or more user control devices 935, such as interactive display or remote interface 550.

Connection 996, which may be an HDMI data connection, may connect embedded computer 905 with one or more HDMI output display devices 930.

Connection 960, which may be a USB data and electrical connection, may connect embedded computer 905 with one or more USB devices 925.

Connections 965, which may form a CAN data bus, may connect embedded computer 905 with one or more electronic speed controllers 915 and one or more sensory feedback units 920. ESC 915 may be a thruster controller to allow embedded computer 905 to control the speed, power draw, and thrust of thrusters in the EDF. An ESC may have the following connections: to the power supply, to a thruster, and to the processor, such as embedded computer 905, to a microcontroller, and or to sensory feedback units 920. ESC pulls power from the power supply and allocates it to the thrusters to control the amount of thrust produced by EDF.

Figure 10:
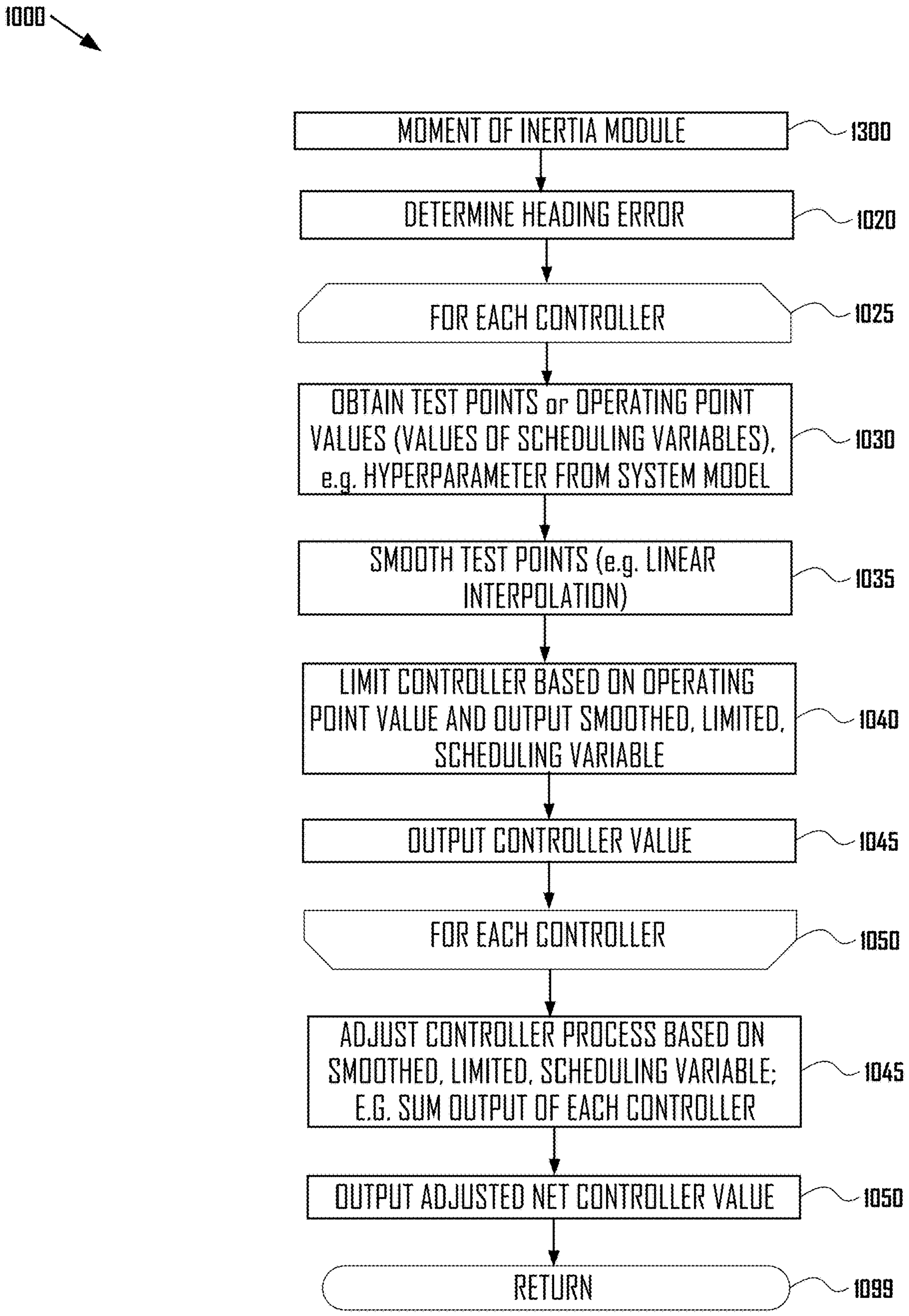
FIG. 10 illustrates a gain adjustment module of an SLCS, in accordance with one embodiment.

FIG. 10 illustrates gain adjustment module 1000 of an SLCS in accordance with one embodiment. Instructions of, or which embody, gain adjustment module 1000 may be stored in, for example, memory 525, and may be executed or performed by, for example, processor 520, as well as by electrical circuits, firmware, and other computer and logical hardware of SLCS with which gain adjustment module 1000 may interact. In embodiments, computer processors and memory to perform some or all of gain adjustment module 1000 may be remote from SLCS, such as in an auxiliary computer in, for example, a carrier.

At block 1300, gain adjustment module 1000 may call or enter autonomous state response module 1300. In overview, autonomous state response module 1300 may determine the hyperparameter of, for example, a normalized moment of inertia, such as according to a ration of a force command to the thrusters and an angular acceleration of the SLCS. Autonomous state response module 1300 may further determine a relative orientation of thrusters, based on direction information in the angular acceleration. Autonomous state response module 1300 may return the hyperparameter. The hyperparameter may be considered or referred to as a normalized moment of inertia. The hyperparameter may comprise a ratio of a force command to the thrusters and an angular acceleration of the SLCS.

At block 1020, gain adjustment module 1000 may determine a heading error. The heading error may be a difference between a current orientation and a target orientation. The difference between the current orientation and the target orientation may also be referred to as an error or a heading error.

Opening loop block 1025 to closing loop block 1050 may iterate over each of several controllers in a control loop of gain adjustment module 1000. For example, if the control loop comprises a closed loop, including a PID loop, including a PID loop organized in a cascade control architecture, then the PID loop may comprise a proportional-based response to the error, an integral-based response to the error, and a derivative-based response to the error; each of the proportional-based response to the error, the integral-based response to the error, and the derivative-based response to the error may be referred to as a "controller" and may be referred to by opening loop block 1025 to closing loop block 1050. A proportionate controller may control an actuator in proportion to the error. An integral controller may control the actuator according the amount of time the error has been at or near a value. A derivative controller may control an actuator according to a rate of change of the error over time. In a closed PID loop, output of each of the controllers may be summed to produce one output.

However, due to problems such as changing circumstances and seeking behavior, operation of the controllers may be adjusted by gain adjustment module 1000 or a similar module. In the example illustrated in gain adjustment module 1000, at block 1030 gain adjustment module 1000 may obtain test points or values of scheduling variables, which may also be referred to as operating point values. For example, at differing test points (or differing values of scheduling variables) which may obtain at differing times during operation (such as when first starting toward a target orientation, when nearing a target orientation, when keeping a target orientation), gain adjustment module 1000 may adjust resulting operation of a controller.

At block 1035, gain adjustment module 1000 may smooth the test points or operating point values, e.g. through linear interpolation or the like.

At block 1040, gain adjustment module 1000 may limit the then-current controller based on the test points. For example, the operating point value may be the hyperparameter. For example, gain adjustment module 1000 may saturate the proportionate heading error in the proportionate controller according to the hyperparameter. For example, gain adjustment module 1000 may saturate the proportionate heading error in the proportionate controller according to angular velocity multiplied by Kd/Kp.

At block 1045, gain adjustment module 1000 may output the controller value determined at block 1045.

At closing loop block 1050, gain adjustment module 1000 may return to opening loop block 1025 to iterate over the controllers and over future instances in time.

At block 1055, gain adjustment module 1000 may adjust the controller process based on the smoothed, limited, scheduling test point variable. For example, in the case of a PID controller, gain adjustment module 1000 may sum the output of the controller values.

This may cause each of the controller processes to produce an increased, decreased, or the same output value that the controller process would have output, without operation of gain adjustment module 1000. The change, based on the test point and with input of the hyperparameter from autonomous state response module 1300, may thereby produce changes or adjustments to gain of a thrust control signal, in response to then-current and dynamic circumstances, changes in the load, disturbance forces, and the like.

At block 1050, gain adjustment module 1000 may output or return the adjusted net controller value to, for example, to block 1000 in decision and control module 700.

Figure 11:
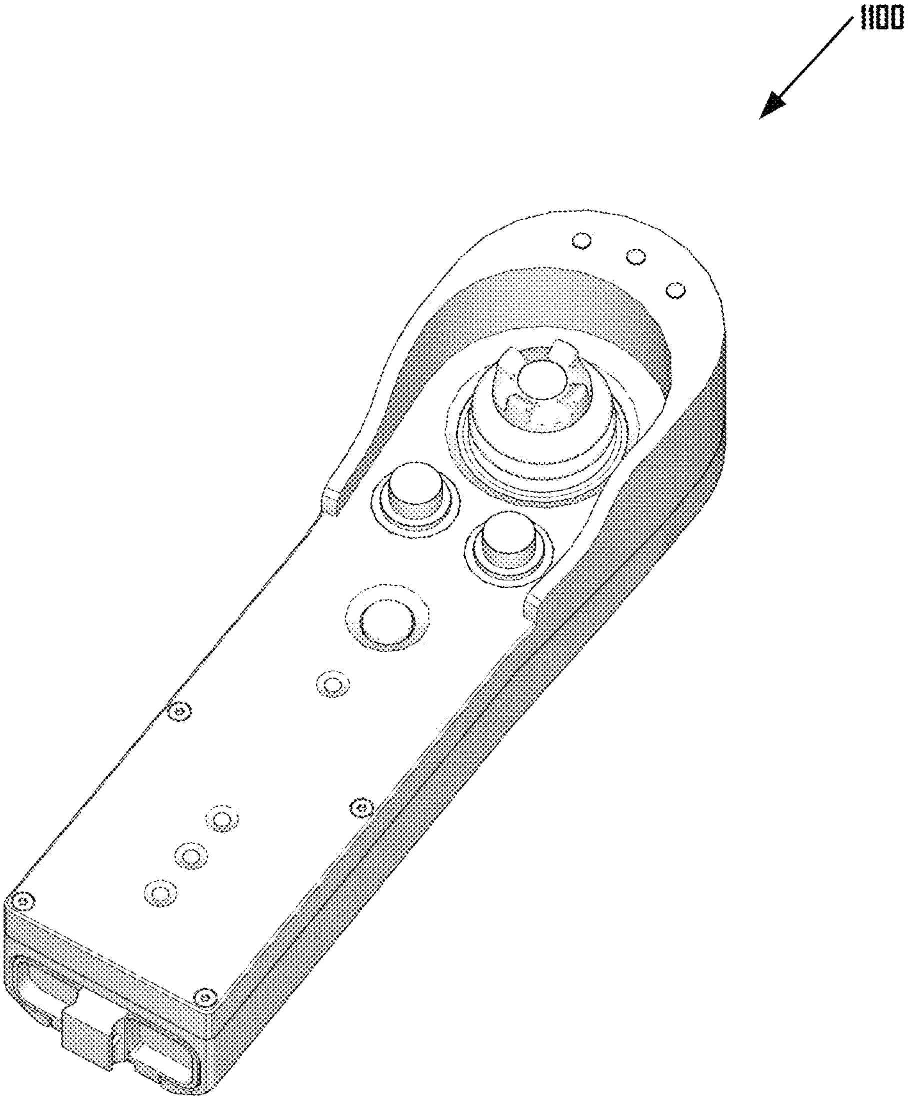
FIG. 11 illustrates an oblique perspective view of a remove interface of an SLCS, in accordance with one embodiment.

FIG. 11 illustrates an embodiment of a remote interface or remote pendant 1100. Remote pendant 1100 may comprise, for example, an on/off switch, state selector, and manual/rotational control. The on/off switch may be used to turn on remote pendant 1100. State selector may be used to select a command state of operational module 600, as may be discussed in relation to FIG. 6. An activation controller may be used to activate or deactivate an SLCS in or relative to a selected command state. The manual/rotational control may be used to manually activate fans to rotate or translate a load when, for example, state selector has been used to select, for example, direct control mode 627. A joystick may be incorporated into remote pendant 1100, such as in replacement of or in addition to manual control.

Regarding FIG. 12, please see paragraph or portions of this document otherwise referencing FIG. 12 and or elements therein.

Figure 13:
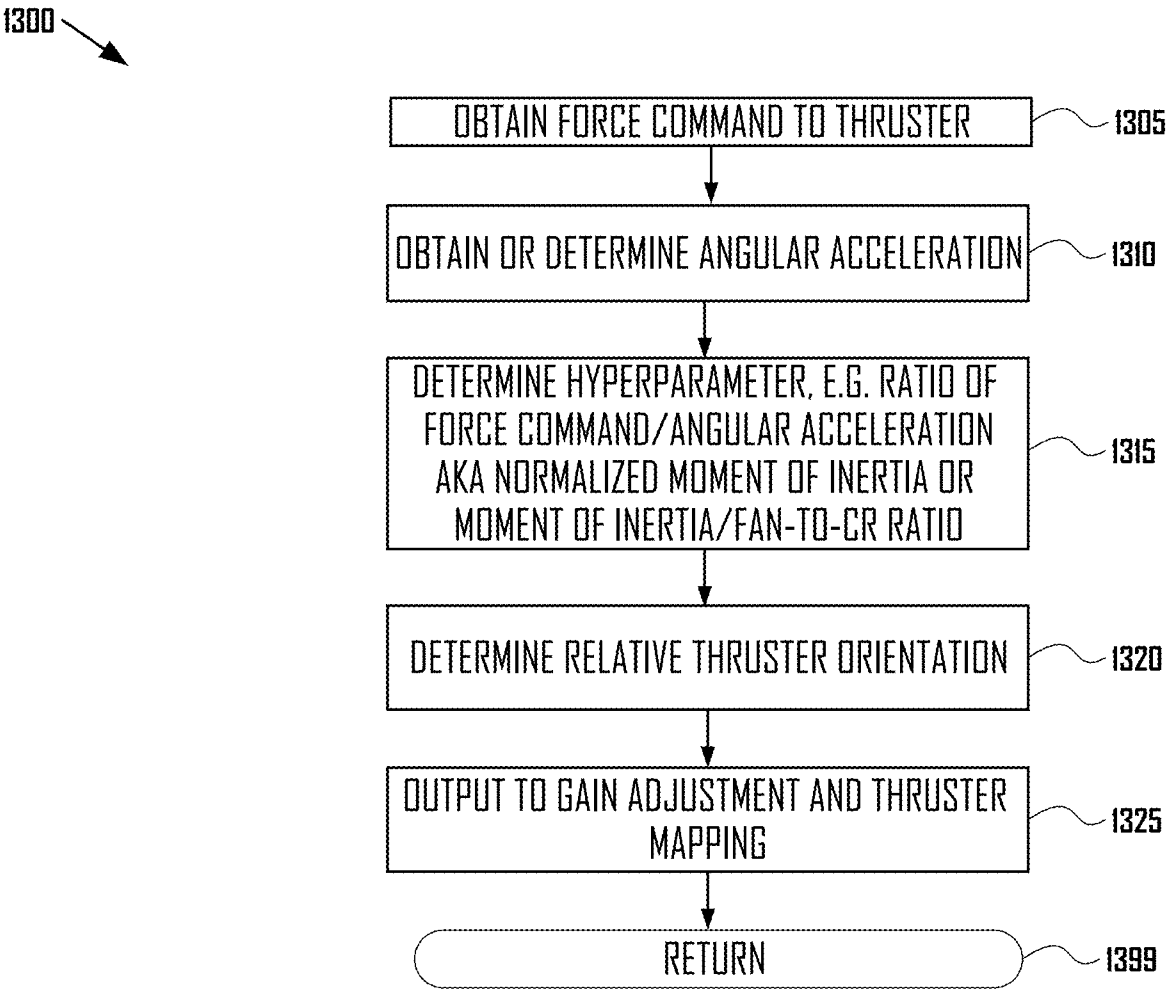
FIG. 13 illustrates an autonomous state response module of an SLCS, in accordance with one embodiment.

FIG. 13 illustrates autonomous state response module 1300 of an SLCS in accordance with one embodiment. Instructions of, or which embody, autonomous state response module 1300 may be stored in, for example, memory 525, and may be executed or performed by, for example, processor 520, as well as by electrical circuits, firmware, and other computer and logical hardware of SLCS with which autonomous state response module 1300 may interact. In embodiments, computer processors and memory to perform some or all of autonomous state response module 1300 may be remote from SLCS, such as in an auxiliary computer in, for example, a carrier.

At block 1305, autonomous state response module 1300 may obtain a force command to thrusters of an SLCS. The force command may comprise at least one of a newton, a voltage, or an amperage. Autonomous state response module 1300 may determine the newton based on at least one of the voltage or the amperage and a motor rating of the thruster. The force command may further identify which thruster(s) are sent the force command.

At block 1310, autonomous state response module 1300 may obtain an angular acceleration of the SLCS. The angular acceleration may be obtained from, for example, at least one of a gyroscope or an accelerometer of the SLCS, such as a gyroscope or an accelerometer of an IMU of the SLCS. In the International System of Units, the angular acceleration may be radians per second squared. The sensor may provide a value convertible into the angular acceleration, such as an angular rate. If the sensor provides angular rate, angular rate may be converted into the angular acceleration by determining a numerical derivative of a filtered angular rate. The angular acceleration may comprise a direction, e.g. the value may be positive if the angular speed increases counterclockwise or decreases clockwise and may be negative if the angular speed increases clockwise or decreases counterclockwise.

At block 1315, from a ration of the force command and the angular acceleration autonomous state response module 1300 may determine a hyperparameter, e.g. force command over angular acceleration. The hyperparameter may be understood as a normalized moment of inertia or ratio of moment-of-inertia over fan-to-center of rotation ("CR").

At block 1320, autonomous state response module 1300 may determine a relative thruster orientation, based on which thruster(s) were sent the force command and the direction of the angular acceleration.

At block 1325, autonomous state response module 1300 may output the hyperparameter to, for example, gain adjustment module 1000 and may output the thruster orientation to, for example, thruster mapping. The thruster orientation and thruster mapping may be used, for example, at block 745 of decision and control module 700 to determine the actuator mix.

At done block 1399, autonomous state response module 1300 may exit or return to another process which may have called it.

Figure 14:
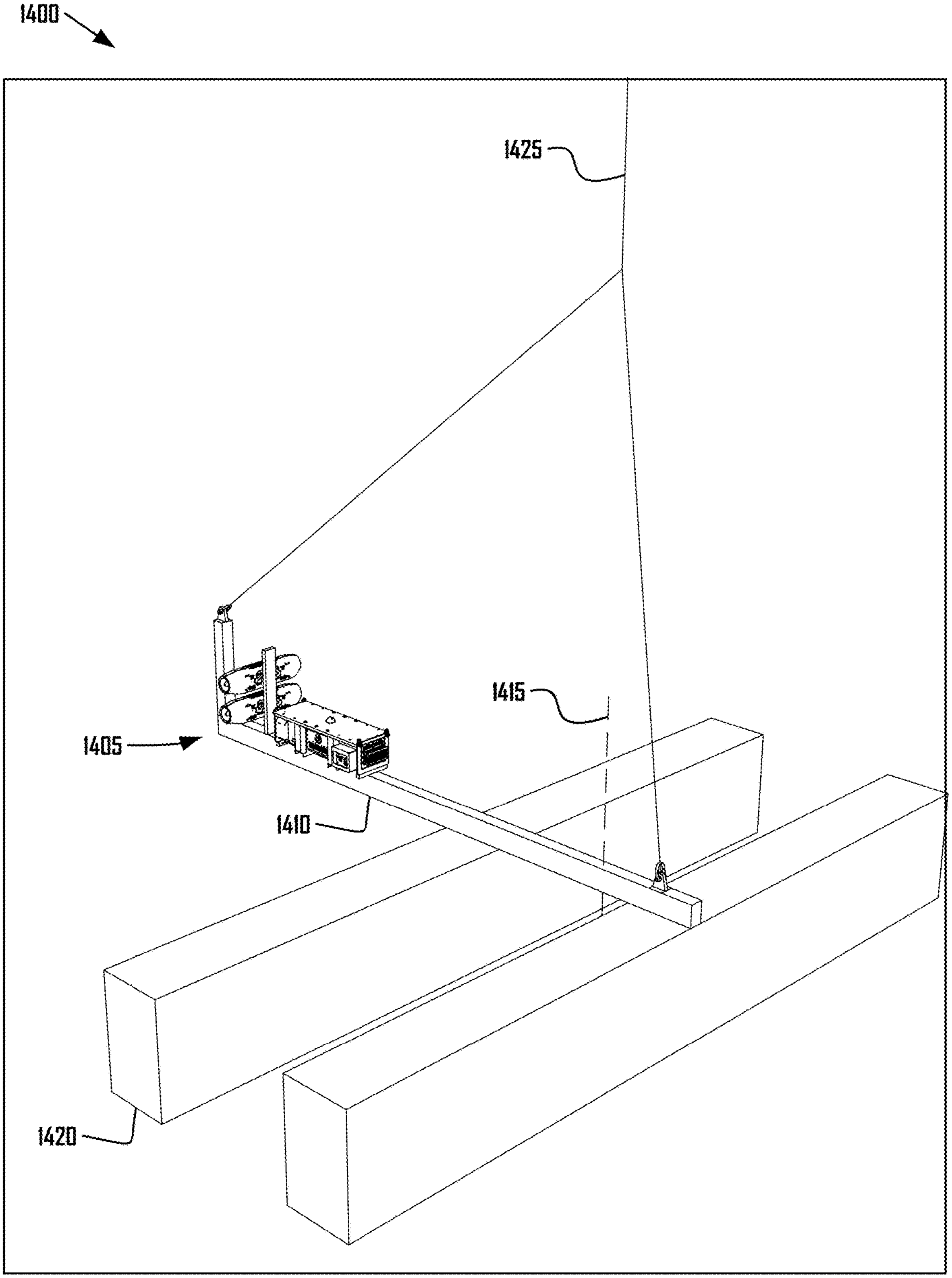
FIG. 14 illustrates an oblique perspective view of an SLCS with two thruster groups on a same side of the SLCS and in a first orientation, in accordance with one embodiment.

FIG. 14 illustrates an oblique perspective view of SLCS 1405 on frame 1410. SLCS 1405 comprises two thruster groups on a same side of SLCS 1405 and generally perpendicular to frame 1410. Frame 1410 is secured to suspended load 1420 and suspension cable(s) 1425 beneath a carrier (not shown), such as a crane. The two thruster groups on the same side of SLCS 1405 may be positioned to provide a large moment arm, with a center of rotation of SLCS 1405 and suspended load 1420 occurring approximately at dashed line 1415. The gross configuration of frame 1410, suspended load 1420 and suspension cable(s) 1425 may be due to requirements of a construction project.

In prior art approaches to stabilizing or controlling suspended load 1420, tag lines might be connected to suspended load 1420, though tag lines may be undesirable for a wide range of reasons. If a prior art SLCS was used to stabilize suspended load 1420, "hard coded" values for the location of the thruster groups may need to be input into SLCS 1420 along with updates to the logical programming of SLCS 1405 to account for center of rotation 1415. Performing this update may be time consuming and modifications to a gain control system of SLCS 1405 may require testing and tuning. If such "hard coded" updates were made to SLCS 1405, SLCS 1405 may not be able to control frame 1410 when suspended load 1420 is not attached, which may further complicate operations and require use of tag lines merely to align frame 1410 to connect it with suspended load 1420.

In contrast, with autonomous state response module 1300, gain adjustment module 1000, data fusion and telemetry output module 800, and decision and control module 700 as disclosed herein, through use of the hyperparameter generally representing a normalized moment of inertia of SLCS 1405, frame 1410, suspended load 1420, and center of rotation 1415, SLCS 1405 will be able to control frame 1410 and or suspended load 1420. Furthermore, SLCS 1405 will be able to respond to changing disturbance forces.

Figure 15:
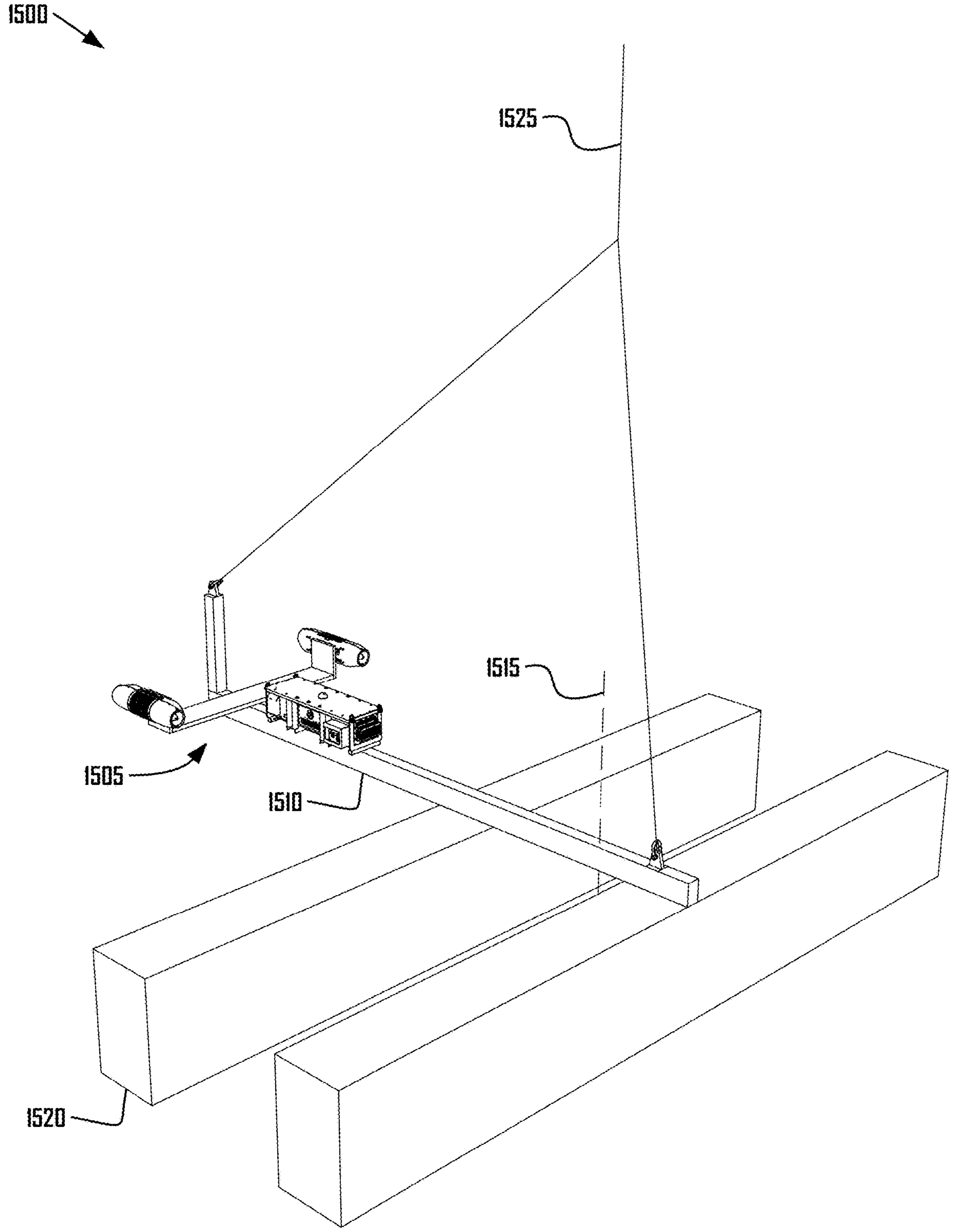
FIG. 15 illustrates an oblique perspective view of an SLCS with two thruster groups on a same side of the SLCS and in a first orientation, in accordance with one embodiment.

FIG. 15 illustrates an oblique perspective view of an SLCS with two thruster groups on a same side of the SLCS and in a second orientation, in accordance with one embodiment.

FIG. 15 illustrates an oblique perspective view of SLCS 1505 on frame 1510. SLCS 1505 comprises two thruster groups on a same side of SLCS 1405 and generally parallel to frame 1510. Frame 1510 is secured to suspended load 1520 and suspension cable(s) 1525 beneath a carrier (not shown), such as a crane. The two thruster groups on the same side of SLCS 1505 may be positioned on a subframe to provide a moment arm with respect to center of rotation occurring approximately at dashed line 1515 and to allow SLCS 1505 to drive suspended load 1520 toward or away from a target location (e.g. "fly to target"). The gross configuration of frame 1510, suspended load 1520, suspension cable(s) 1525, and the target location may be due to requirements of a construction project.

In prior art approaches to stabilizing or controlling suspended load 1520, tag lines might be connected to suspended load 1520, though tag lines may be undesirable for a wide range of reasons. If a prior art SLCS was used to stabilize suspended load 1520, "hard coded" values for the location of the thruster groups may need to be input into SLCS 1520 along with updates to the logical programming of SLCS 1505 to account for center of rotation 1515. Performing this update may be time consuming and modifications to a gain control system of SLCS 1505 may require testing and tuning. If such "hard coded" updates were made to SLCS 1505, SLCS 1505 may not be able to control frame 1510 when suspended load 1520 is not attached, which may further complicate operations and require use of tag lines merely to align frame 1510 to connect it with suspended load 1520.

In contrast, with autonomous state response module 1300, gain adjustment module 1000, data fusion and telemetry output module 800, and decision and control module 700 as disclosed herein, through use of the hyperparameter generally representing a normalized moment of inertia of SLCS 1505, frame 1510, suspended load 1520, and center of rotation 1515, SLCS 1505 will be able to control frame 1510 and or suspended load 1520. Furthermore, SLCS 1505 will be able to respond to changing disturbance forces.

Figure 16:
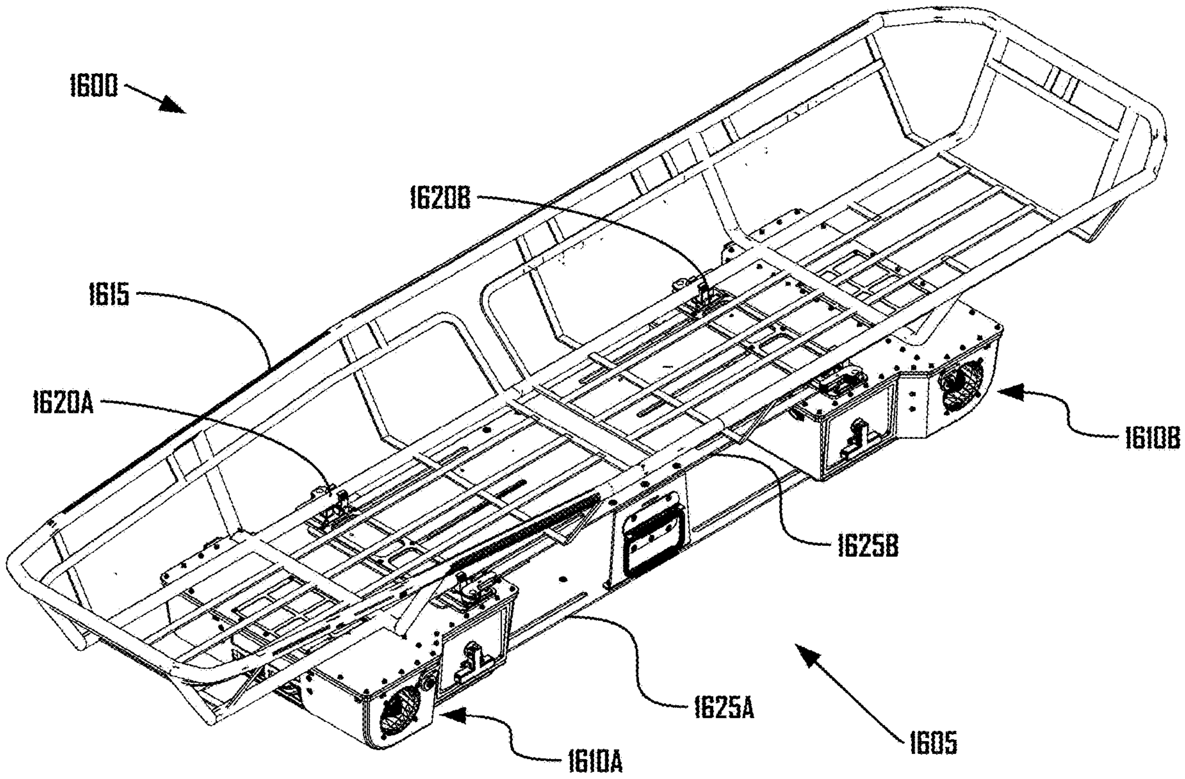
FIG. 16 illustrates an oblique parallel projection view of an SLCS secured to a litter, in accordance with an embodiment.

FIG. 16 illustrates an oblique parallel projection view of SLCS 1605 secured to litter 1615. As discussed herein, SLCS 1605 comprises thruster group 1610A and 1610B secured to litter 1615 with brackets 1620. Thruster group 1610A and 1610B and brackets 1620 may slide along grooves in plate 1625A and 1625B, allowing thruster group 1610A and 1610B to be further or closer together. Changing a distance between the thrusters, and changing this relative to a center of rotation, changes the torque output by the thrusters. Furthermore, during a mission, a rescuer may intermittently come into contact with litter 1615 and a rescuee may or may not be present in litter 1615. Without the hyperparameter discussed herein, such changes might require hard-coded input, modifications to and testing of the gain control system, or might require that the system model estimate state conditions such as thruster-to-thruster distance and center of rotation, through the use of other sensor data which may be more complex, which may not update so quickly, which may be less reliable, and the like, compared to use of the hyperparameter as disclosed herein regarding autonomous state response module 1300, gain adjustment module 1000, data fusion and telemetry output module 800, and decision and control module 700.

Although specific embodiments have been illustrated and described herein, it will be appreciated by those of ordinary skill in the art that alternate and or equivalent implementations may be substituted for the specific embodiments shown and described without departing from the scope of the present disclosure. For example, although various embodiments are described above in terms of a helicopter ownship, in other embodiments an SLCS may be employed under a construction crane or gantry. This application is intended to cover any adaptations or variations of the embodiments discussed herein.

Embodiments of the operations described herein may be implemented in a computer-readable storage device having stored thereon instructions that when executed by one or more processors perform the methods. The processor may include, for example, a processing unit and or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and or later and or related versions of this specification.

As used in any embodiment herein, the term "logic" may refer to the logic of the instructions of an app, software, and or firmware, and or the logic embodied into a programmable circuitry by a configuration bit stream, to perform any of the aforementioned operations. Software may be embodied as a software package, code, instructions, instruction sets and or data recorded on non-transitory computer readable storage medium. Firmware may be embodied as code, instructions or instruction sets and or data that are hard-coded (e.g., nonvolatile) in memory devices. Flow charts for logic or software may be illustrated herein as part of one module or as separate from one another in separate modules or otherwise as having a logical arrangement; many different logical arrangements are functionally equivalent.

"Circuitry", as used in any embodiment herein, may comprise, for example, singly or in any combination, hardwired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and or logic implementation(s) for the various logic and or circuitry described herein. For example, in one embodiment the hardware description language may comply or be compatible with a very high speed integrated circuits (VHSIC) hardware description language (VHDL) that may enable semiconductor fabrication of one or more circuits and or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and or other versions of the IEEE VHDL standards and or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and or memory (shared, dedicated, or group) or in another computer hardware component or device that execute one or more software or firmware programs having executable machine instructions (generated from an assembler and or a compiler) or a combination, a combinational logic circuit, and or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Following are non-limiting examples:

Example 1. An apparatus to rotate or laterally move a load, comprising: a thruster, a thrust controller, and a sensor suite, wherein the sensor suite is to obtain a sensor data; a computer processor and a memory, wherein the memory comprises an autonomous state response module and a decision and control module; wherein the computer processor is to execute the autonomous state response module and the decision and control module; wherein the thrust controller comprises the autonomous state response module and the decision and control module; wherein the autonomous state response module is to receive and process the sensor data and continuously determine a hyperparameter with respect to the apparatus and any load secured thereto (herein, the "apparatus and any load secured thereto" are referred to as "apparatus"); and wherein the decision and control module is to determine a thrust control signal to output to the thruster based at least in part on the hyperparameter; wherein at least the apparatus and the thruster are suspended on a suspension cable beneath a carrier.

Example 2. The apparatus according to example 1 or another claim or example herein, wherein the hyperparameter comprises a force command to the thruster in a ratio with an angular acceleration of the apparatus.

Example 3. The apparatus according to example 2 or another claim or example herein, wherein the ratio comprises the force command over the angular acceleration of the apparatus.

Example 4. The apparatus according to example 3 or another claim or example herein, wherein the force command to the thruster comprises at least one of a newton, a voltage, or an amperage.

Example 5. The apparatus according to example 4 or another claim or example herein, wherein the force command to the thruster comprises the newton and wherein the newton is determined based on at least one of the voltage or the amperage and a motor rating of the thruster.

Example 6. The apparatus according to example 2 or another claim or example herein, wherein the angular acceleration of the apparatus comprises a direction.

Example 7. The apparatus according to example 6 or another claim or example herein, wherein the thrust controller is to determine at least one of an actuator mix or a thruster mapping based at least in part on the direction, wherein the actuator mix or thruster mapping is, at least in part, to determine the thrust control signal to output to the thruster.

Example 8. The apparatus according to example 2 or another claim or example herein, wherein the sensor comprises at least one of an accelerometer or a gyroscope and wherein the angular acceleration of the apparatus or a value to be converted into the angular acceleration of the apparatus is to be provided by the at least one of the accelerometer or the gyroscope.

Example 9. The apparatus according to example 1 or another claim or example herein, wherein the hyperparameter is a normalized moment of inertia and disturbance estimator.

Example 10. The apparatus according to example 1 or another claim or example herein, wherein the thrust controller is to process the hyperparameter to cause the thrust control signal to continuously account for a state of the apparatus.

Example 11. The apparatus according to example 10 or another claim or example herein, wherein the state of the apparatus comprises at least one of an orientation of the thruster, a thrust output of the thruster, a mass of the load, a distance between the thruster and a second thruster, a distance between the thruster and a center of rotation of the load, and a disturbance force on the apparatus.

Example 12. The apparatus according to example 1 or another claim or example herein, wherein to determine the thrust control signal to output to the thruster based at least in part on the hyperparameter further comprises to limit a maximum allowed angular velocity of the apparatus based on the hyperparameter.

Example 13. The apparatus according to example 1 or another claim or example herein, wherein the thrust controller comprises a control loop and wherein to determine the thrust control signal to output to the thruster based at least in part on the hyperparameter further comprises to modify the control loop based on the hyperparameter.

Example 14. The apparatus according to example 13 or another claim or example herein, wherein the thrust controller is to determine a difference between a desired set point and a measured set point (the difference between the desired set point and the measured set point also being referred to herein as the, "error"), wherein the control loop comprises a response to the error, and wherein to modify the control loop based on the hyperparameter comprise to modify the response to the error based on the hyperparameter.

Example 15. The apparatus according to example 14 or another claim or example herein, wherein the control loop is to determine at least one of a proportional response to the error, an integral of the error and an integral response to the error, and a derivative of the error and a derivative response to the error and wherein to modify the response to the error comprise to modify at least one of the proportional response to the error, the integral response to the error, and the derivative response to the error.

Example 16. The apparatus according to example 13 or another claim or example herein, wherein the control loop comprises one of an open loop, a closed loop, or a feed-forward loop.

Example 17. The apparatus according to example 13 or another claim or example herein, wherein the control loop comprises a proportional, integral, and derivative controller ("PID controller").

Example 18. The apparatus according to example 1 or another claim or example herein, wherein the thrust controller comprises an adaptive filter and wherein to determine the hyperparameter, the autonomous state response module is to determine the hyperparameter in the adaptive filter.

Example 19. The apparatus according to example 18 or another claim or example herein, wherein the adaptive filter comprises at least one of a linear filter, a non-linear filter, an adaptive notch filter, a recursive least squares filter, a least mean squares filter, a Volterra least mean squares filter, a kernel adaptive filter, a spline adaptive filter, an Unscented Kalman Filter, a Urysohn adaptive filter, or a neural network.

Example 20. The apparatus according to example 18 or another claim or example herein, wherein the adaptive filter comprises a transfer function.

Example 21. The apparatus according to example 18 or another claim or example herein, wherein the adaptive filter comprises a system model.

Example 22. The apparatus according to example 18 or another claim or example herein, wherein the adaptive filter is to produce at least an operating point value.

Example 23. The apparatus according to example 22 or another claim or example herein, wherein the operating point value comprises the hyperparameter.

Example 24. The apparatus according to example 22 or another claim or example herein, wherein the thrust controller is to determine the operating point value based on a system model.

Example 25. The apparatus according to example 24 or another claim or example herein, wherein the system model comprises at least one of a normalized moment of inertia of the apparatus, a length of the suspension cable, a rotation of the apparatus, a lateral movement of the apparatus, and a lateral movement and or rotation of the carrier.

Example 26. The apparatus according to example 25 or another claim or example herein, wherein the normalized moment of inertia of the apparatus comprises a force command to the thruster in a ratio with an angular acceleration of the apparatus.

Example 27. The apparatus according to example 22 or another claim or example herein, wherein the operating point value is determined based on a plurality of test points.

Example 28. The apparatus according to example 27 or another claim or example herein, wherein the operating point value is determined based on linear interpolation between the plurality of test points.

Example 29. The apparatus according to example 1 or another claim or example herein, wherein the thrust controller comprises a control loop, wherein the control loop is to determine the thrust control signal based at least in part on the hyperparameter and an error, wherein the error comprises a difference between a last-measured orientation of the load and a target orientation of the load.

Example 30. The apparatus according to example 29 or another claim or example herein, wherein the thrust controller is to modify the control loop based on a gain control schedule, wherein the gain control schedule is to modify at least one of a proportional-based response to the error, an integral-based response to the error, and a derivative-based response to the error based on the hyperparameter.

Example 31. A method to rotate or laterally move a suspended load with a suspended load control system, comprising: receiving a sensor data; continuously determining, based on the sensor data, a hyperparameter with respect to the suspended load control system and any load secured thereto (herein, the "suspended load control system and any load secured thereto" are referred to as "suspended load control system"); and determining a thrust control signal to output to a thruster of the suspended load control system based at least in part on the hyperparameter; wherein at least the suspended load control system and the thruster are suspended on a suspension cable beneath a carrier.

Example 32. The method according to example 31 or another claim or example herein, wherein the hyperparameter comprises a force command to the thruster in a ratio with an angular acceleration of the load control system.

Example 33. The method according to example 32 or another claim or example herein, wherein the ratio comprises the force command over the angular acceleration of the load control system.

Example 34. The method according to example 33 or another claim or example herein, wherein the force command to the thruster comprises at least one of a newton, a voltage, or an amperage.

Example 35. The method according to example 34 or another claim or example herein, wherein the force command to the thruster comprises the newton and further comprising determining the newton based on at least one of the voltage or the amperage and a motor rating of the thruster.

Example 36. The method according to example 32 or another claim or example herein, wherein the angular acceleration of the load control system comprises a direction.

Example 37. The method according to example 36 or another claim or example herein, comprising determining at least one of an actuator mix or a thruster mapping based at least in part on the direction, and further comprising determining the thrust control signal to output to thruster based at least in part on the at least one of the actuator mix or the thruster mapping.

Example 38. The method according to example 32 or another claim or example herein, wherein the sensor comprises at least one of an accelerometer or a gyroscope and further comprising receiving the angular acceleration of the load control system or a value to be converted into the angular acceleration of the load control system from the at least one of the accelerometer or the gyroscope.

Example 39. The method according to example 31 or another claim or example herein, wherein the hyperparameter is a normalized moment of inertia and disturbance estimator.

Example 40. The method according to example 31 or another claim or example herein, wherein determining the thrust control signal to output to a thruster of the suspended load control system based at least in part on the hyperparameter further comprises continuously accounting for a state of the load control system.

Example 41. The method according to example 40 or another claim or example herein, wherein the state of the load control system comprises at least one of an orientation of the thruster, a thrust output of the thruster, a mass of the load, a distance between the thruster and a second thruster, a distance between the thruster and a center of rotation of the load, and a disturbance force on the load control system.

Example 42. The method according to example 31 or another claim or example herein, wherein determining the thrust control signal to output to the thruster based at least in part on the hyperparameter further comprises limiting a maximum allowed angular velocity of the load control system based on the hyperparameter.

Example 43. The method according to example 31 or another claim or example herein, wherein determining the thrust control signal to output to the thruster based at least in part on the hyperparameter further comprises determining the thrust control signal to output to the thruster based at least in part on the hyperparameter with a control loop and modifying the control loop based on the hyperparameter.

Example 44. The method according to example 43 or another claim or example herein, wherein modifying the control loop based on the hyperparameter comprises determining a difference between a desired set point and a measured set point (the difference between the desired set point and the measured set point also being referred to herein as the, "error"), determining a response to the error to apply in the control loop, and wherein modifying the control loop based on the hyperparameter comprise to modifying the response to the error based on the hyperparameter.

Example 45. The method according to example 44 or another claim or example herein, further comprising determining at least one of a proportional response to the error, an integral of the error and an integral response to the error, and a derivative of the error and a derivative response to the error and wherein modifying the response to the error comprise modifying at least one of the proportional response to the error, the integral response to the error, and the derivative response to the error.

Example 46. The method according to example 43 or another claim or example herein, wherein the control loop comprises one of an open loop, a closed loop, or a feed-forward loop.

Example 47. The method according to example 43 or another claim or example herein, wherein the control loop comprises a proportional, integral, and derivative controller ("PID controller").

Example 48. The method according to example 31 or another claim or example herein, wherein determining the hyperparameter comprises determining the hyperparameter in an adaptive filter.

Example 49. The method according to example 48 or another claim or example herein, wherein the adaptive filter comprises at least one of a linear filter, a non-linear filter, an adaptive notch filter, a recursive least squares filter, a least mean squares filter, a Volterra least mean squares filter, a kernel adaptive filter, a spline adaptive filter, an Unscented Kalman Filter, a Urysohn adaptive filter, or a neural network.

Example 50. The method according to example 48 or another claim or example herein, wherein the adaptive filter comprises a transfer function.

Example 51. The method according to example 48 or another claim or example herein, wherein the adaptive filter comprises a system model.

Example 52. The method according to example 48 or another claim or example herein, further comprising producing an operating point value with the adaptive filter.

Example 53. The method according to example 52 or another claim or example herein, wherein the operating point value comprises the hyperparameter.

Example 54. The method according to example 52 or another claim or example herein, further comprising determining the operating point value based on a system model in the adaptive filter.

Example 55. The method according to example 54 or another claim or example herein, wherein the system model comprises at least one of a normalized moment of inertia of the load control system, a length of the suspension cable, a rotation of the load control system, a lateral movement of the load control system, and a lateral movement and or rotation of the carrier.

Example 56. The method according to example 55 or another claim or example herein, wherein the normalized moment of inertia of the load control system comprises a force command to the thruster in a ratio with an angular acceleration of the load control system.

Example 57. The method according to example 52 or another claim or example herein, further comprising determining the operating point value based on a plurality of test points.

Example 58. The method according to example 57 or another claim or example herein, further comprising determining the operating point value based on linear interpolation between the plurality of test points.

Example 59. The method according to example 31 or another claim or example herein, further comprising determining an error, wherein the error comprises a difference between a last-measured orientation of the load and a target orientation of the load, and wherein determining the thrust control signal to output to the thruster comprises determining the thrust control signal to output to the thruster in a control loop based at least in part on the hyperparameter and the error.

Example 60. The method according to example 59 or another claim or example herein, further comprising modifying at least one of a proportional-based response to the error, an integral-based response to the error, and a derivative-based response to the error in the control loop based on a gain control schedule and the hyperparameter.

Example 61. A computer apparatus to control a load suspended from a carrier, comprising: means to receive a sensor data; means to continuously determine, based on the sensor data, a hyperparameter with respect to the apparatus and any load secured thereto (herein, the "apparatus and any load secured thereto" are referred to as "apparatus"); and means to determine a thrust control signal to output to a thruster of the apparatus based at least in part on the hyperparameter; wherein at least the apparatus and the thruster are suspended on a suspension cable beneath a carrier.

Example 62. The apparatus according to example 61 or another claim or example herein, wherein the hyperparameter comprises a force command to the thruster in a ratio with an angular acceleration of the apparatus.

Example 63. The apparatus according to example 62 or another claim or example herein, wherein the ratio comprises the force command over the angular acceleration of the apparatus.

Example 64. The apparatus according to example 63 or another claim or example herein, wherein the force command to the thruster comprises at least one of a newton, a voltage, or an amperage.

Example 65. The apparatus according to example 64 or another claim or example herein, wherein the force command to the thruster comprises the newton and further comprising means to determine the newton based on at least one of the voltage or the amperage and a motor rating of the thruster.

Example 66. The apparatus according to example 62 or another claim or example herein, wherein the angular acceleration of the apparatus comprises a direction.

Example 67. The apparatus according to example 66 or another claim or example herein, further comprising means to determine at least one of an actuator mix or a thruster mapping based at least in part on the direction, and further comprising means to determine the thrust control signal to output to thruster based at least in part on the at least one of the actuator mix or the thruster mapping.

Example 68. The apparatus according to example 62 or another claim or example herein, wherein the sensor comprises at least one of an accelerometer or a gyroscope and further comprising means to receive the angular acceleration of the apparatus or a value to be converted into the angular acceleration of the apparatus from the at least one of the accelerometer or the gyroscope.

Example 69. The apparatus according to example 61 or another claim or example herein, wherein the hyperparameter is a normalized moment of inertia and disturbance estimator.

Example 70. The apparatus according to example 61 or another claim or example herein, wherein means to determine the thrust control signal to output to a thruster of the apparatus based at least in part on the hyperparameter further comprises means to continuously account for a state of the apparatus.

Example 71. The apparatus according to example 70 or another claim or example herein, wherein the state of the apparatus comprises at least one of an orientation of the thruster, a thrust output of the thruster, a mass of the load, a distance between the thruster and a second thruster, a distance between the thruster and a center of rotation of the load, and a disturbance force on the apparatus.

Example 72. The apparatus according to example 61 or another claim or example herein, wherein means to determine the thrust control signal to output to the thruster based at least in part on the hyperparameter further comprises means to limit a maximum allowed angular velocity of the apparatus based on the hyperparameter.

Example 73. The apparatus according to example 61 or another claim or example herein, wherein means to determine the thrust control signal to output to the thruster based at least in part on the hyperparameter comprises means to determine the thrust control signal to output to the thruster based at least in part on the hyperparameter with a control loop and further comprising means to modify the control loop based on the hyperparameter.

Example 74. The apparatus according to example 73 or another claim or example herein, wherein means to modify the control loop based on the hyperparameter comprises means to determine a difference between a desired set point and a measured set point (the difference between the desired set point and the measured set point also being referred to herein as the, "error"), means to determine a response to the error to apply in the control loop, and wherein means to modify the control loop based on the hyperparameter comprises means to modifying the response to the error based on the hyperparameter.

Example 75. The apparatus according to example 74 or another claim or example herein, further comprising means to determine at least one of a proportional response to the error, an integral of the error and an integral response to the error, and a derivative of the error and a derivative response to the error and wherein means to modify the response to the error comprises means to modify at least one of the proportional response to the error, the integral response to the error, and the derivative response to the error.

Example 76. The apparatus according to example 73 or another claim or example herein, wherein the control loop comprises one of an open loop, a closed loop, or a feed-forward loop.

Example 77. The apparatus according to example 73 or another claim or example herein, wherein the control loop comprises a proportional, integral, and derivative controller ("PID controller").

Example 78. The apparatus according to example 61 or another claim or example herein, wherein means to determine the hyperparameter comprises means to determine the hyperparameter in an adaptive filter.

Example 79. The apparatus according to example 78 or another claim or example herein, wherein the adaptive filter comprises at least one of a linear filter, a non-linear filter, an adaptive notch filter, a recursive least squares filter, a least mean squares filter, a Volterra least mean squares filter, a kernel adaptive filter, a spline adaptive filter, an Unscented Kalman Filter, a Urysohn adaptive filter, or a neural network.

Example 80. The apparatus according to example 78 or another claim or example herein, wherein the adaptive filter comprises a transfer function.

Example 81. The apparatus according to example 78 or another claim or example herein, wherein the adaptive filter comprises a system model.

Example 82. The apparatus according to example 78 or another claim or example herein, further comprising means to produce an operating point value with the adaptive filter.

Example 83. The apparatus according to example 82 or another claim or example herein, wherein the operating point value comprises the hyperparameter.

Example 84. The apparatus according to example 82 or another claim or example herein, further comprising means to determine the operating point value based on a system model in the adaptive filter.

Example 85. The apparatus according to example 84 or another claim or example herein, wherein the system model comprises at least one of a normalized moment of inertia of the apparatus, a length of the suspension cable, a rotation of the apparatus, a lateral movement of the apparatus, and a lateral movement and or rotation of the carrier.

Example 86. The apparatus according to example 85 or another claim or example herein, wherein the normalized moment of inertia of the apparatus comprises a force command to the thruster in a ratio with an angular acceleration of the apparatus.

Example 87. The apparatus according to example 82 or another claim or example herein, further comprising means to determine the operating point value based on a plurality of test points.

Example 88. The apparatus according to example 87 or another claim or example herein, further comprising means to determine the operating point value based on linear interpolation between the plurality of test points.

Example 89. The apparatus according to example 61 or another claim or example herein, further comprising means to determine an error, wherein the error comprises a difference between a last-measured orientation of the load and a target orientation of the load, and wherein means to determine the thrust control signal to output to the thruster comprises means to determine the thrust control signal to output to the thruster in a control loop based at least in part on the hyperparameter and the error.

Example 90. The apparatus according to example 89 or another claim or example herein, further comprising means to modify at least one of a proportional-based response to the error, an integral-based response to the error, and a derivative-based response to the error in the control loop based on a gain control schedule and the hyperparameter.

Example 91. One or more computer-readable media comprising instructions that cause a suspended load control apparatus, in response to execution of the instructions by a processor of the suspended load control apparatus, to: receive a sensor data regarding the suspended load control apparatus; continuously determine, based on the sensor data, a hyperparameter with respect to the suspended load control apparatus and any load secured thereto (herein, the "suspended load control apparatus and any load secured thereto" are referred to as "apparatus"); and determine a thrust control signal to output to a thruster of the suspended load control apparatus based at least in part on the hyperparameter; wherein at least the apparatus and the thruster are suspended on a suspension cable beneath a carrier.

Example 92. The computer-readable media according to example 91 or another claim or example herein, wherein the hyperparameter comprises a force command to the thruster in a ratio with an angular acceleration of the apparatus.

Example 93. The computer-readable media according to example 92 or another claim or example herein, wherein the ratio comprises the force command over the angular acceleration of the apparatus.

Example 94. The computer-readable media according to example 93 or another claim or example herein, wherein the force command to the thruster comprises at least one of a newton, a voltage, or an amperage.

Example 95. The computer-readable media according to example 94 or another claim or example herein, wherein the force command to the thruster comprises the newton and wherein the computer-readable media are further to cause the suspended load control apparatus to determine the newton based on at least one of the voltage or the amperage and a motor rating of the thruster.

Example 96. The computer-readable media according to example 92 or another claim or example herein, wherein the angular acceleration of the apparatus comprises a direction.

Example 97. The apparatus according to example 96 or another claim or example herein, wherein the computer-readable media are further to cause the suspended load control apparatus to determine at least one of an actuator mix or a thruster mapping based at least in part on the direction, and determine the thrust control signal to output to thruster based at least in part on the at least one of the actuator mix or the thruster mapping.

Example 98. The computer-readable media according to example 92 or another claim or example herein, wherein the sensor comprises at least one of an accelerometer or a gyroscope and wherein the computer-readable media are further to cause the suspended load control apparatus to receive the angular acceleration of the load control apparatus or a value to be converted into the angular acceleration of the load control apparatus from the at least one of the accelerometer or the gyroscope.

Example 99. The computer-readable media according to example 91 or another claim or example herein, wherein the hyperparameter is a normalized moment of inertia and disturbance estimator.

Example 100. The computer-readable media according to example 91 or another claim or example herein, wherein to determine the thrust control signal to output to a thruster of the suspended load control apparatus based at least in part on the hyperparameter the computer-readable media are further to cause the suspended load control apparatus to continuously account for a state of the apparatus.

Example 101. The computer-readable media according to example 100 or another claim or example herein, wherein the state of the apparatus comprises at least one of an orientation of the thruster, a thrust output of the thruster, a mass of the load, a distance between the thruster and a second thruster, a distance between the thruster and a center of rotation of the load, and a disturbance force on the apparatus.

Example 102. The computer-readable media according to example 91 or another claim or example herein, wherein to determine the thrust control signal to output to the thruster based at least in part on the hyperparameter further comprises to limit a maximum allowed angular velocity of the apparatus based on the hyperparameter.

Example 103. The computer-readable media according to example 91 or another claim or example herein, wherein to determine the thrust control signal to output to the thruster based at least in part on the hyperparameter comprises the computer-readable media further causing the suspended load control apparatus to determine the thrust control signal to output to the thruster based at least in part on the hyperparameter with a control loop and to modify the control loop based on the hyperparameter.

Example 104. The computer-readable media according to example 103 or another claim or example herein, wherein to modify the control loop based on the hyperparameter comprises to determine a difference between a desired set point and a measured set point (the difference between the desired set point and the measured set point also being referred to herein as the, "error"), to determine a response to the error to apply in the control loop, and wherein to modify the control loop based on the hyperparameter comprises to modifying the response to the error based on the hyperparameter.

Example 105. The computer-readable media according to example 104 or another claim or example herein, wherein the computer-readable media are further to cause the suspended load control apparatus to determine at least one of a proportional response to the error, an integral of the error and an integral response to the error, and a derivative of the error and a derivative response to the error and wherein to modify the response to the error comprises to modify at least one of the proportional response to the error, the integral response to the error, and the derivative response to the error.

Example 106. The computer-readable media according to example 103 or another claim or example herein, wherein the control loop comprises one of an open loop, a closed loop, or a feed-forward loop.

Example 107. The computer-readable media according to example 103 or another claim or example herein, wherein the control loop comprises a proportional, integral, and derivative controller ("PID controller").

Example 108. The computer-readable media according to example 91 or another claim or example herein, wherein to determine the hyperparameter comprises to determine the hyperparameter in an adaptive filter.

Example 109. The computer-readable media according to example 108 or another claim or example herein, wherein the adaptive filter comprises at least one of a linear filter, a non-linear filter, an adaptive notch filter, a recursive least squares filter, a least mean squares filter, a Volterra least mean squares filter, a kernel adaptive filter, a spline adaptive filter, an Unscented Kalman Filter, a Urysohn adaptive filter, or a neural network.

Example 110. The computer-readable media according to example 108 or another claim or example herein, wherein the adaptive filter comprises a transfer function.

Example 111. The computer-readable media according to example 108 or another claim or example herein, wherein the adaptive filter comprises a system model.

Example 112. The computer-readable media according to example 108 or another claim or example herein, wherein the computer-readable media further cause the suspended load control apparatus to produce an operating point value with the adaptive filter.

Example 113. The computer-readable media according to example 112 or another claim or example herein, wherein the operating point value comprises the hyperparameter.

Example 114. The computer-readable media according to example 112 or another claim or example herein, wherein the computer-readable media further cause the suspended load control apparatus to determine the operating point value based on a system model in the adaptive filter.

Example 115. The computer-readable media according to example 114 or another claim or example herein, wherein the system model comprises at least one of a normalized moment of inertia of the apparatus, a length of the suspension cable, a rotation of the apparatus, a lateral movement of the apparatus, and a lateral movement and or rotation of the carrier.

Example 116. The computer-readable media according to example 115 or another claim or example herein, wherein the normalized moment of inertia of the apparatus comprises a force command to the thruster in a ratio with an angular acceleration of the apparatus.

Example 117. The computer-readable media according to example 112 or another claim or example herein, wherein the computer-readable media further cause the suspended load control apparatus to determine the operating point value based on a plurality of test points.

Example 118. The computer-readable media according to example 117 or another claim or example herein, wherein the computer-readable media further cause the suspended load control apparatus to determine the operating point value based on linear interpolation between the plurality of test points.

Example 119. The computer-readable media according to example 91 or another claim or example herein, wherein the computer-readable media further cause the suspended load control apparatus to determine an error, wherein the error comprises a difference between a last-measured orientation of the load and a target orientation of the load, and wherein to determine the thrust control signal to output to the thruster comprises to determine the thrust control signal to output to the thruster in a control loop based at least in part on the hyperparameter and the error.

Example 120. The computer-readable media according to example 119 or another claim or example herein, wherein the computer-readable media further cause the suspended load control apparatus to modify at least one of a proportional-based response to the error, an integral-based response to the error, and a derivative-based response to the error in the control loop based on a gain control schedule and the hyperparameter.

The invention claimed is:

1. An apparatus to rotate or laterally move a load, comprising:

a thruster, a thrust controller, and a sensor suite, wherein the sensor suite is to obtain a sensor data;

a computer processor and a memory, wherein the memory comprises an autonomous state response module and a decision and control module;

wherein the computer processor is to execute the autonomous state response module and the decision and control module;

wherein the thrust controller comprises the autonomous state response module and the decision and control module;

wherein the autonomous state response module is to receive and process the sensor data and continuously determine a hyperparameter with respect to the apparatus and any load secured thereto; and wherein the decision and control module is to determine a thrust control signal to output to the thruster based at least in part on the hyperparameter;

wherein at least the apparatus, the thruster, and any load secured thereto are suspended on a suspension cable beneath a carrier.

2. The apparatus according to claim 1, wherein the hyperparameter comprises a force command to the thruster in a ratio with an angular acceleration of the apparatus.

3. The apparatus according to claim 2, wherein the angular acceleration of the apparatus comprises a direction.

4. The apparatus according to claim 3, wherein the thrust controller is to determine at least one of an actuator mix or a thruster mapping based at least in part on the direction, wherein the actuator mix or thruster mapping is, at least in part, to determine the thrust control signal to output to the thruster.

5. The apparatus according to claim 1, wherein the hyperparameter is a normalized moment of inertia and disturbance estimator.

6. The apparatus according to claim 1, wherein the thrust controller is to process the hyperparameter to cause the thrust control signal to continuously account for a state of the apparatus.

7. The apparatus according to claim 6, wherein the state of the apparatus comprises at least one of an orientation of the thruster, a thrust output of the thruster, a mass of the load, a distance between the thruster and a second thruster, a distance between the thruster and a center of rotation of the load, and a disturbance force on the apparatus.

8. The apparatus according to claim 1, wherein to determine the thrust control signal to output to the thruster based at least in part on the hyperparameter further comprises to limit a maximum allowed angular velocity of the apparatus based on the hyperparameter.

9. A method to rotate or laterally move a suspended load with a suspended load control system, comprising:

receiving a sensor data;

continuously determining, based on the sensor data, a hyperparameter with respect to the suspended load control system and any load secured thereto; and determining a thrust control signal to output to a thruster of the suspended load control system based at least in part on the hyperparameter; wherein at least the suspended load control system, the thruster, and any load secured thereto are suspended on a suspension cable beneath a carrier.

10. The method according to claim 9, wherein the hyperparameter comprises a force command to the thruster in a ratio with an angular acceleration of the load control system.

11. The method according to claim 10, wherein the angular acceleration of the load control system comprises a direction and further comprising determining at least one of an actuator mix or a thruster mapping based at least in part on the direction, and further comprising determining the thrust control signal to output to thruster based at least in part on the at least one of the actuator mix or the thruster mapping.

12. The method according to claim 9, wherein the hyperparameter is a normalized moment of inertia and disturbance estimator.

13. The method according to claim 9, wherein determining the thrust control signal to output to a thruster of the suspended load control system based at least in part on the hyperparameter further comprises continuously accounting for a state of the load control system.

14. The method according to claim 13, wherein the state of the load control system comprises at least one of an orientation of the thruster, a thrust output of the thruster, a mass of the load, a distance between the thruster and a second thruster, a distance between the thruster and a center of rotation of the load, and a disturbance force on the load control system.

15. The method according to claim 9, wherein determining the thrust control signal to output to the thruster based at least in part on the hyperparameter further comprises limiting a maximum allowed angular velocity of the load control system based on the hyperparameter.

16. A computer apparatus to control a load suspended from a carrier, comprising:

means to receive a sensor data;

means to continuously determine, based on the sensor data, a hyperparameter with respect to the apparatus and any load secured thereto; and means to determine a thrust control signal to output to a thruster of the apparatus based at least in part on the hyperparameter; wherein at least the apparatus, the thruster, and any load secured thereto are suspended on a suspension cable beneath a carrier.

17. The apparatus according to claim 16, wherein the hyperparameter comprises a force command to the thruster in a ratio with an angular acceleration of the apparatus.

18. The apparatus according to claim 17, wherein the angular acceleration of the apparatus comprises a direction and further comprising means to determine at least one of an actuator mix or a thruster mapping based at least in part on the direction, and further comprising means to determine the thrust control signal to output to thruster based at least in part on the at least one of the actuator mix or the thruster mapping.

19. The apparatus according to claim 16, wherein the hyperparameter is a normalized moment of inertia and disturbance estimator.

20. The apparatus according to claim 16, wherein means to determine the thrust control signal to output to a thruster of the apparatus based at least in part on the hyperparameter further comprises means to continuously account for a state of the apparatus.

* * * * *